(12) United States Patent         (10) Patent No.:     US 12,333,085 B2
Tawada                             (45) Date of Patent:       Jun. 17, 2025

(54) INFORMATION PROCESSING APPARATUS AND METHOD FOR CONTROLLING INFORMATION PROCESSING APPARATUS

(71) Applicant: SHARP KABUSHIKI KAISHA, Sakai (JP)

(72) Inventor: Masaki Tawada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/386,309

(22) Filed: Nov. 2, 2023

(65) Prior Publication Data

US 2024/0168570 A1    May 23, 2024

(30) Foreign Application Priority Data

Nov. 17, 2022  (JP) ................. 2022-184060

(51) Int. Cl.
*G06F 3/02*     (2006.01)
*G06F 3/023*    (2006.01)
*G06F 3/04886*  (2022.01)
*H04N 1/00*     (2006.01)

(52) U.S. Cl.
CPC ........ *G06F 3/0231* (2013.01); *G06F 3/04886* (2013.01); *H04N 1/00384* (2013.01); *H04N 1/00395* (2013.01); *H04N 1/00411* (2013.01); *H04N 2201/0094* (2013.01)

(58) Field of Classification Search
CPC .... G06F 3/023; G06F 3/0231; G06F 3/04886; G06F 3/04895; H04N 1/00384; H04N 1/00395; H04N 1/00411; H04N 2201/0094
See application file for complete search history.

(56) References Cited

U.S. PATENT DOCUMENTS

| | | | | |
|---|---|---|---|---|
| 5,898,861 | A  * | 4/1999 | Emerson ................. | G06F 3/038 703/23 |
| 2012/0102439 | A1 * | 4/2012 | Mitchell ................. | G06F 3/011 715/863 |
| 2017/0364234 | A1 * | 12/2017 | Ligameri .............. | G06F 3/0488 |
| 2019/0267123 | A1 * | 8/2019 | Stueckemann ........ | G06Q 50/22 |

FOREIGN PATENT DOCUMENTS

JP   2000207108 A  *  7/2000
JP   2021-068100 A      4/2021

* cited by examiner

*Primary Examiner* — Kenneth Bukowski
(74) *Attorney, Agent, or Firm* — ScienBiziP, P.C.

(57) ABSTRACT

An information processing apparatus includes: a display; a communicator that communicates with a key input receiving device; and a controller that performs control to display a soft keyboard on the display if the controller does not receive information indicating content of key input from the key input receiving device before a predetermined period of time elapses after the information processing apparatus becomes ready to receive key input.

13 Claims, 22 Drawing Sheets

FIG. 3

| KEY CODE | KEY |
|----------|-----|
| 65 | A |
| 66 | B |
| 67 | C |
| ⋮ | ⋮ |
| 48 | 0 |
| 49 | 1 |
| ⋮ | ⋮ |
| 112 | F1 |
| 113 | F2 |
| ⋮ | ⋮ |
| 13 | Enter |
| 243 | Esc |
| ⋮ | ⋮ |

FIG. 4

| EXTERNAL KEYBOARD ID | EXTERNAL KEYBOARD NAME |
|---|---|
| 00:11:22:33:44:55 | ABC 101 Keyboard |
| aa:bb:cc:77:88:99 | XYZ Japanese Keyboard |
| ⋮ | ⋮ |

FIG. 5

| SETTING ITEM NAME | SETTING VALUE |
|---|---|
| KEYBOARD SETTING | EXTERNAL KEYBOARD PRIORITY |
| SOFT KEYBOARD SWITCH WAITING TIME | 5 SECONDS |
| ⋮ | ⋮ |

FIG. 17

| KEYBOARD ID | KEYBOARD NAME | PRESENCE OR ABSENCE OF ABNORMALITY |
|---|---|---|
| 00:11:22:33:44:55 | ABC 101 Keyboard | PRESENT |
| aa:bb:cc:77:88:99 | XYZ Japanese Keyboard | ABSENT |
| ⋮ | ⋮ | ⋮ |

FIG. 21

| USER NAME | CARD ID | EXTERNAL KEYBOARD ID |
|---|---|---|
| Admin | abc123 | 00:11:22:33:44:55 |
| User1 | XYZ789 | aa:bb:cc:77:88:99 |
| ⋮ | ⋮ | ⋮ |

INFORMATION PROCESSING APPARATUS AND METHOD FOR CONTROLLING INFORMATION PROCESSING APPARATUS

BACKGROUND OF THE INVENTION

Field of the Invention

The present disclosure relates to an information processing apparatus and the like.

Description of the Background Art

Some information processing apparatuses, such as multifunction peripherals, have both a soft keyboard function and a function of connecting to a wireless-enabled external keyboard (physical keyboard) and receiving key input therefrom. A technology has been proposed to display a soft keyboard when and on the condition that communication signals from a physical keyboard in connection are no longer detected.

An objective of the present disclosure is to provide a technology that increases convenience in communication with, for example, a device to be used for key input.

SUMMARY OF THE INVENTION

An information processing apparatus according to an aspect of the present disclosure includes: a display; a communicator that communicates with a key input receiving device; and a controller that performs control to display a soft keyboard on the display if the controller does not receive information indicating content of key input from the key input receiving device before a predetermined period of time elapses after the information processing apparatus becomes ready to receive key input.

A method for controlling an information processing apparatus according to another aspect of the present disclosure is a method for controlling an information processing apparatus including a display and a communicator that communicates with a key input receiving device, the method including performing control to display a soft keyboard on the display if the information processing apparatus does not receive information indicating content of key input from the key input receiving device before a predetermined period of time elapses after the information processing apparatus becomes ready to receive key input.

According to the present disclosure, it is possible to provide a technology that increases convenience in communication with a device to be used for key input.

BRIEF DESCRIPTION OF THE DRAWINGS

FIG. 3 is a diagram showing an example of a data structure of key code information according to the first embodiment.

FIG. 4 is a diagram showing an example of a data structure of external keyboard information according to the first embodiment.

FIG. 5 is a diagram showing an example of a data structure of a setting table according to the first embodiment.

FIG. 17 is a diagram showing an example of a data structure of external keyboard information according to a fifth embodiment.

FIG. 21 is a diagram showing an example of a data structure of user information according to the sixth embodiment.

DESCRIPTION OF THE PREFERRED EMBODIMENTS

Figure 1:
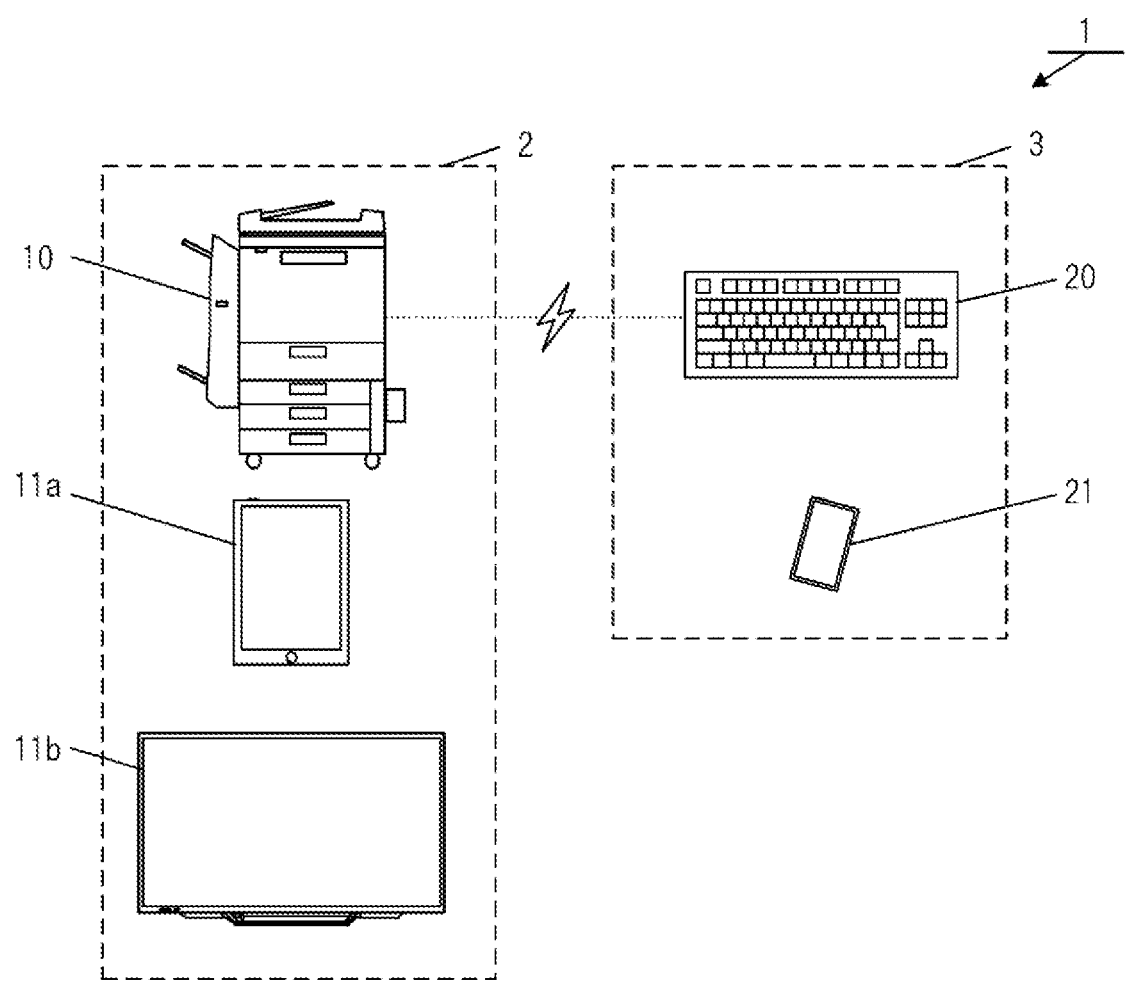
FIG. 1 is a diagram illustrating an overall configuration of a system according to a first embodiment.

The following describes embodiments for implementing the present disclosure with reference to the accompanying drawings. It should be noted that the embodiments described below are examples for explaining the present disclosure, and the technical scope of the present disclosure set forth in the claims is not limited to the following description.

1. First Embodiment

In some instances, an information processing apparatus has both a soft keyboard (also referred to as a software keyboard or a screen keyboard) that is displayed on an existing user interface (UI) screen displayed by the information processing apparatus and a wireless keyboard (external keyboard) that is connected thereto via Bluetooth (registered trademark) or the like, as keyboards to be used for key input to the information processing apparatus. A soft keyboard is displayed on a display device (for example, a display) of the information processing apparatus and allows a user to perform key input operations. Note here that the soft keyboard may be displayed as an interface in the shape of a hardware keyboard with a QWERTY layout, as an interface having input buttons arranged in an alphabetical order or an order of the Japanese kana syllabary, or as an interface in the form of a numeric keypad. Alternatively, the soft keyboard may be displayed as an interface that allows for handwritten input.

Note here that the information processing apparatus is not capable of determining whether the user uses a wireless keyboard or a soft keyboard. For example, the user may be looking for a wireless keyboard. For another example, the user may be thinking of using a soft keyboard but a wireless keyboard may be still enabled. That is, the user may want to use a soft keyboard despite having a wireless keyboard connected to the information processing apparatus. For such a user, it is convenient (user-friendly) that the information processing apparatus performs a process of displaying a soft keyboard after a certain period of inactivity, even when the wireless keyboard is connected thereto.

Conventionally, in order to switch the keyboard set to be used to a soft keyboard when a wireless keyboard is connected, the user needs to perform an action of switching the keyboard set to be used from the wireless keyboard to the soft keyboard by operating a screen being displayed. That is, the user needs to change settings to display the soft keyboard. This operation takes time and is bothersome for the user, compromising the convenience.

In a situation where the need for key input arises while a wireless keyboard is connected to an information processing apparatus according to the present embodiment, therefore, the information processing apparatus changes the keyboard set to be used to a soft keyboard if there has been no key input from an external device such as a wireless keyboard for a certain period of time. If a key input operation is performed on an external device such as a wireless keyboard after the soft keyboard has been displayed, the information processing apparatus according to the present embodiment changes the keyboard set to be used to this external device.

1.1. Overall Configuration

FIG. 1 is a diagram illustrating an overview of a system 1 according to the present embodiment. The system 1 includes an information processing apparatus 2 and an input device 3. The information processing apparatus 2 and the input device 3 wirelessly communicate with each other, and key input (operation of inputting a character or a command by pressing a key) performed by a user on the input device 3 is reflected in the information processing apparatus 2.

The information processing apparatus 2 executes predetermined processes based on user's operations. The information processing apparatus 2 includes, for example, a multifunction peripheral 10, a terminal device 11a such as a tablet computer, and an information display device 11b such as a digital signage display for home use. The multifunction peripheral 10 is, for example, an information processing apparatus that has a copy function, a scan function, a printing function, and a fax function, and is also referred to as an MFP (Multi-Function Printer/Peripheral).

It should be noted that the information processing apparatus 2 includes a display device (for example, a display) and is capable of displaying a soft keyboard on the display device. The information processing apparatus 2 according to the present embodiment is also capable of receiving information indicating the content of key input by the user (referred to below as "key input information") from an external device (for example, the input device 3) through wireless communication and reflecting the key input. The key input information is, for example, key codes. The key codes are codes assigned to respective keys on the keyboard and are, for example, integer values. Alternatively, the key input information may be characters corresponding to keys inputted or codes corresponding to keys inputted.

The input device 3 is a wireless-enabled device that receives key input from the user and transmits key input information based on the key input to a destination device (for example, the information processing apparatus 2) through wireless communication. The input device 3 includes, for example, a wireless keyboard 20 or a terminal device 21 such as a smartphone or a tablet computer.

It should be noted that the following describes the present embodiment using a configuration in which the information processing apparatus 2 is the multifunction peripheral 10, and the input device 3 is the wireless keyboard 20.

1.2. Functional Configuration 1.2.1 Multifunction Peripheral

Figure 2:
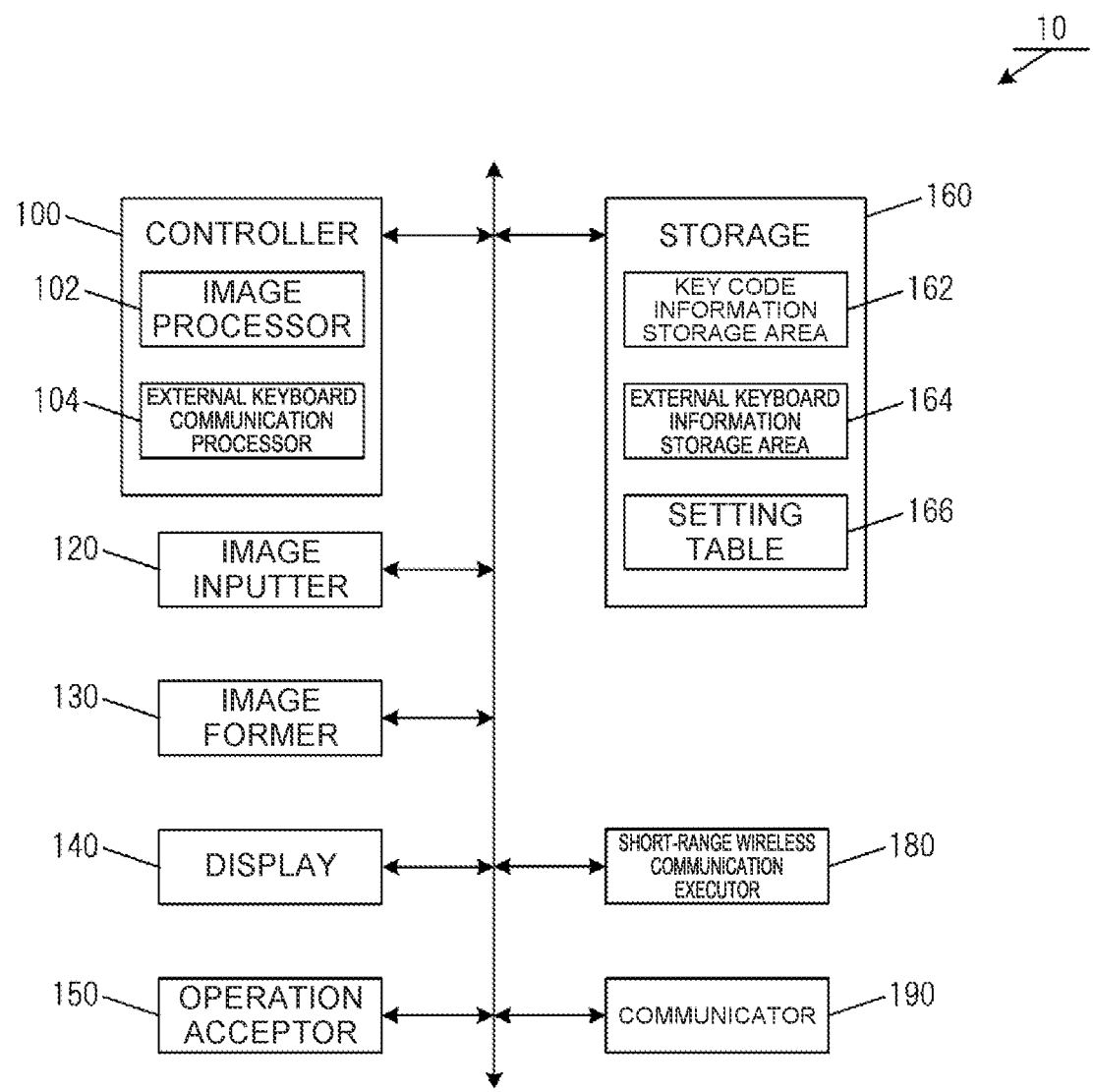
FIG. 2 is a diagram illustrating a functional configuration of a multifunction peripheral according to the first embodiment.

FIG. 2 is a diagram illustrating a functional configuration of the multifunction peripheral 10. As illustrated in FIG. 2, the multifunction peripheral 10 includes a controller 100, an image inputter 120, an image former 130, a display 140, an operation acceptor 150, a storage 160, a short-range wireless communication executor 180, and a communicator 190.

The controller 100 is a functional unit for performing overall control of the multifunction peripheral 10. The controller 100 reads and executes various programs stored in the storage 160 to implement various functions, and includes one or more central processing units (CPUs), for example. The controller 100 may be a system on a chip (SoC) having a plurality of functions among functions described below.

The controller 100 functions as an image processor 102 and an external keyboard communication processor 104 by executing a program stored in the storage 160.

The image processor 102 performs various image-related processes. For example, the image processor 102 performs a sharpening process and a tone conversion process on an image inputted through the image inputter 120 and the communicator 190.

The external keyboard communication processor 104 processes communication with an external keyboard. The external keyboard is a device different from the multifunction peripheral 10. The external keyboard receives key input and transmits key input information. The external keyboard communication processor 104 establishes a connection with an external keyboard registered with the multifunction peripheral 10 and receives key input information indicating the content of key input performed on the external keyboard. The external keyboard registered with the multifunction peripheral 10 refers to an external keyboard for which information related thereto has been stored as external keyboard information in an external keyboard information storage area 164 described below.

The image inputter 120 inputs images to the multifunction peripheral 10. The image inputter 120 includes, for example, a scanner device that reads a document placed on a document table. The scanner device converts, for example, the image into an electrical signal using an image sensor such as a charge coupled device (CCD) or a contact image sensor (CIS), and quantizes and encodes the electrical signal. The image inputter 120 may include an interface (terminal) for reading an image stored in a universal serial bus (USB) flash drive, and input the image read from the USB flash drive. Alternatively, the image inputter 120 may receive an image from other equipment via the communicator 190 and input the image.

The image former 130 forms (prints) an image on a recording medium such as recording paper. The image former 130 includes, for example, a printing device such as an electrophotographic laser printer. For example, the image former 130 feeds recording paper from a paper feed tray provided on the multifunction peripheral 10, forms an image on a surface of the recording paper, and discharges the recording paper onto a paper discharge tray provided on the multifunction peripheral 10.

The display 140 displays various information. The display 140 includes, for example, a display device such as a liquid crystal display (LCD), an organic electro-luminescence (OLED) display, or a micro light-emitting diode (LED) display.

The operation acceptor 150 receives an operation instruction from a user using the multifunction peripheral 10. The operation acceptor 150 includes an input device such as key switches (hard keys) or a touch sensor. The touch sensor may detect, for example, an input through a contact (touch) by a common detection method such as a resistive method, an infrared method, an inductive method, or a capacitive method. It should be noted that the multifunction peripheral 10 may have a touch panel including the display 140 and the operation acceptor 150 integrated into one unit.

The storage 160 stores therein various types of data and various types of programs necessary for operation of the multifunction peripheral 10. The storage 160 includes, for example, a storage device such as a solid state drive (SSD), which is semiconductor memory, or a hard disk drive (HDD).

In the storage 160, a key code information storage area 162 and the external keyboard information storage area 164 are reserved as storage areas. The storage 160 also stores therein a setting table 166.

Information including key codes and keys on each keyboard in association with each another (key code information) is stored in the key code information storage area 162. For example, the key code information includes key codes (for example, "65") and corresponding keys on the keyboard (for example, "A") as shown in FIG. 3. The keys may be alphanumeric keys, function keys (for example, "F1"), or control keys (for example, "Enter"). The key code information is prestored.

Information on external keyboards registered with the multifunction peripheral 10 (external keyboard information) is stored in the external keyboard information storage area 164. As shown in FIG. 4, the external keyboard information includes, for example, external keyboard IDs that identify respective external keyboards (for example, "00:11:22:33:44:55") and external keyboard names that are names given to the keyboards corresponding to the respective external keyboard IDs (for example, "ABC 101 Keyboard").

As each external keyboard ID, at least information that allows for identification of the corresponding external keyboard is stored. For example, in a case where a Bluetooth keyboard (wireless keyboard) is used as an external keyboard, the device address of the Bluetooth keyboard is stored as the external keyboard ID. Instead of the external keyboard ID, the serial number of the external keyboard or the ID set for the external keyboard may be stored as information that allows for identification of the external keyboard.

Settings of the multifunction peripheral 10 are stored in the setting table 166. As shown in FIG. 5, the setting table 166 contains, for example, setting item names (for example, "keyboard setting") and setting values corresponding to the setting item names (for example, "external keyboard priority") in association with each other. The setting values in the setting table 166 may be prestored or may be changeable according to user's operations.

In the present embodiment, the setting table 166 contains the setting values of "keyboard setting" and setting values of "soft keyboard switch waiting time" as shown in FIG. 5. The keyboard setting refers to a setting item for setting a keyboard to be used for key input, and either "soft keyboard priority" or "external keyboard priority" is stored as a setting value thereof.

The setting value of the keyboard setting being "soft keyboard priority" means that the multifunction peripheral 10 displays a soft keyboard when the need for key input, such as character input, arises. The setting value of the keyboard setting being "external keyboard priority" means that the multifunction peripheral 10 accepts operations from an external keyboard when the need for key input, such as character input, arises. The multifunction peripheral 10 may be able to switch the keyboard set to be used to a soft keyboard or to an external keyboard according to a user's operation while key input is received.

The soft keyboard switch waiting time refers to a period of time during which the multifunction peripheral 10 waits for key input from an external keyboard before displaying a soft keyboard after a request for key input has been made, when the setting value of the keyboard setting is "external keyboard priority".

The short-range wireless communication executor 180 performs short-range wireless communication with other equipment by a short-range wireless communication method. The short-range wireless communication executor 180 includes, for example, a communication device having an antenna. The short-range wireless communication executor 180 may employ any of short-range wireless communication methods (wireless communication methods) that are generally used for short-range communication, such as Bluetooth. It should be noted that the short-range wireless communication executor 180 may be a receiver using, for example, universal serial bus (USB).

The communicator 190 communicates with other devices and equipment, such as the wireless keyboard 20, via a network such as a local area network (LAN) or a wide area network (WAN). The communicator 190 includes, for example, a communication device or a communication module such as a network interface card (NIC) that is used in a wired/wireless LAN. It should be noted that the communicator 190 may have an interface connectable to a network (network I/F).

1.2.2. Wireless Keyboard

Figure 6:
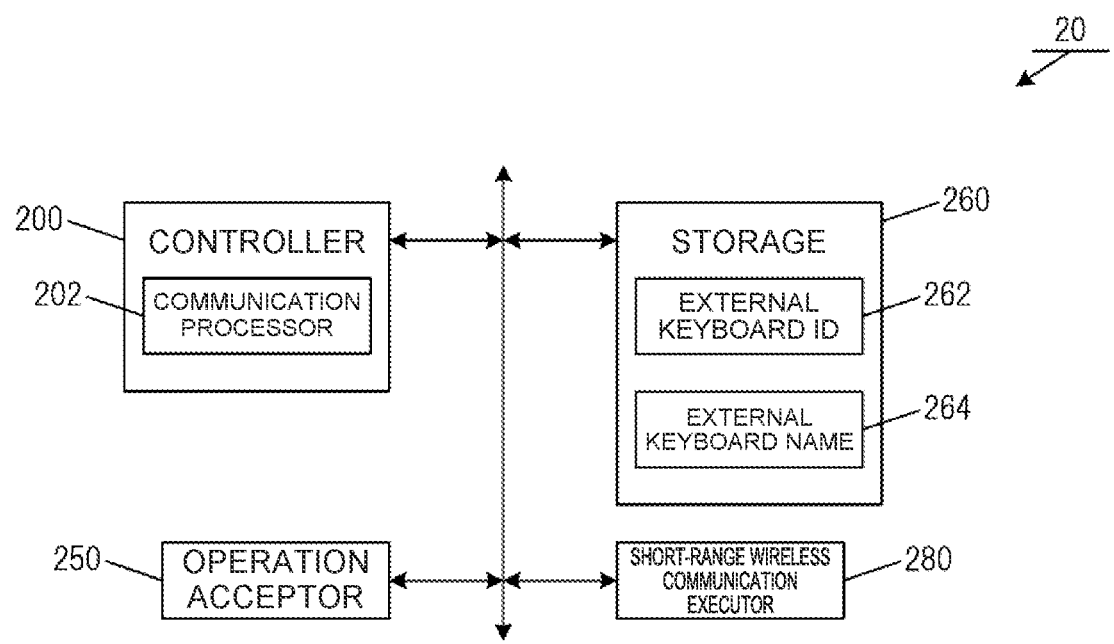
FIG. 6 is a diagram illustrating a functional configuration of an external keyboard according to the first embodiment.

FIG. 6 is a diagram illustrating a functional configuration of the wireless keyboard 20. As shown in FIG. 6, the wireless keyboard 20 includes a controller 200, an operation acceptor 250, a storage 260, and a short-range wireless communication executor 280.

The controller 200 is a functional unit for performing overall control of the wireless keyboard 20. The controller 200 reads and executes various programs stored in the storage 260 to implement various functions, and includes one or more central processing units (CPUs), for example. The controller 200 may be an SoC having a plurality of functions among functions described below.

The controller 200 functions as a communication processor 202 by executing a program stored in the storage 260. The communication processor 202 establishes a connection with a destination device (for example, the multifunction peripheral 10) and transmits key input information to the destination device.

For example, the communication processor 202 establishes a connection with a destination device and transmits information (for example, an external keyboard ID 262 and an external keyboard name 264) necessary for the destination device to register the wireless keyboard 20 as an external keyboard. Upon receiving key input via the operation acceptor 250, the communication processor 202 transmits, via the short-range wireless communication executor 280, key input information based on the key input to the destination device in connection. For example, in a configuration in which the operation acceptor 250 includes key switches (hard keys), the communication processor 202 transmits, to the destination device in connection, a key code corresponding to a key switch pressed by the user as key input information.

The operation acceptor 250 receives an operation instruction from a user using the wireless keyboard 20.

The operation acceptor 250 includes, for example, key switches (hard keys).

The storage 260 stores therein various types of data and various types of programs necessary for operation of the wireless keyboard 20. The storage 260 includes, for example, a storage device such as an electrically erasable programmable read-only memory (EEPROM) or a solid state drive (SSD).

The storage 260 stores therein the external keyboard ID 262, which is information to be used to identify the wireless keyboard 20, and the external keyboard name 264, which is a name given to the wireless keyboard 20.

The short-range wireless communication executor 280 performs short-range wireless communication with other equipment by a short-range wireless communication method. The short-range wireless communication executor 280 includes, for example, a communication device having an antenna. The short-range wireless communication executor 280 may employ any of short-range wireless communication methods (wireless communication methods) that are generally used for short-range communication, such as Bluetooth. The short-range wireless communication executor 280 may be a device that emits radio waves that can be received by a receiver using, for example, USB.

1.3. Flow of Processing

The following describes a flow of processing according to the present embodiment. The description is given on the assumption that the wireless keyboard 20 is registered with the multifunction peripheral 10 as a usable external keyboard. That is, the multifunction peripheral 10 has preliminarily received the external keyboard ID and the external keyboard name from the wireless keyboard 20, and stored such information as external keyboard information. Furthermore, "external keyboard priority" is stored as the setting value of "keyboard setting" in the setting table 166.

Figure 7:
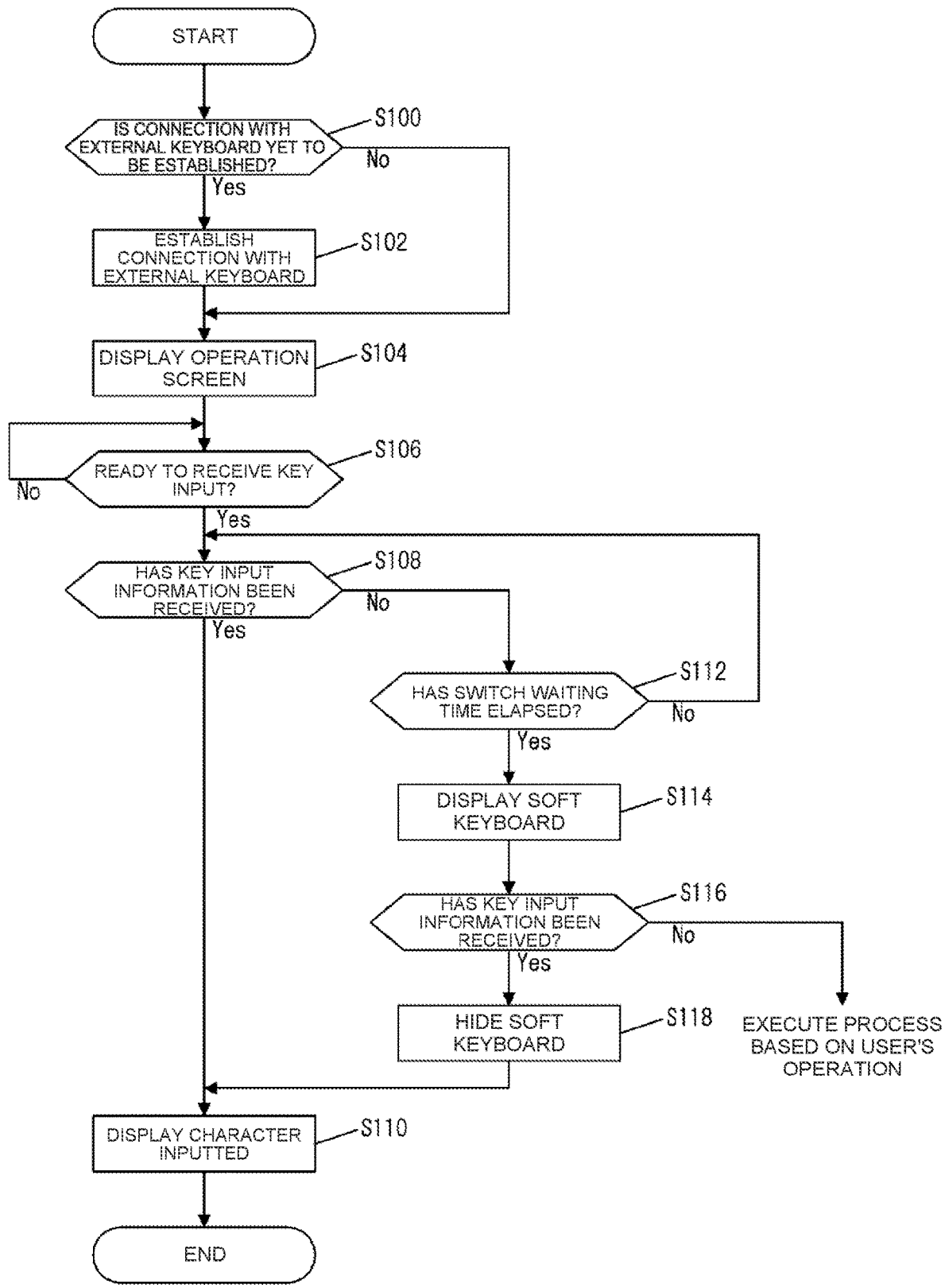
FIG. 7 is a flowchart showing a flow of main processing according to the first embodiment.

The following describes a flow of principal processing (main processing) to be executed by the multifunction peripheral 10 in the present embodiment with reference to FIG. 7. The processing shown in FIG. 7 is executed through the controller 100 reading a program stored in the storage 160. In particular, the processing is executed when a user starts using the multifunction peripheral 10 and an operation screen, such as a login screen, that requires key input such as character input first is displayed. The controller 100 can determine that a user has started using the multifunction peripheral 10 when an operation performed on the multifunction peripheral 10 is reset or when the multifunction peripheral 10 reverts from a standby state to a normal state.

First, the controller 100 (external keyboard communication processor 104) determines whether or not a connection with an external keyboard is yet to be established (Step S100). If a connection with an external keyboard is yet to be established, the controller 100 (external keyboard communication processor 104) establishes a connection with an external keyboard (Yes in Step S100→Step S102).

For example, the external keyboard communication processor 104 reads external keyboard information stored in the external keyboard information storage area 164. The external keyboard communication processor 104 then establishes a connection with an external keyboard identified using the external keyboard ID and the external keyboard name included in the read external keyboard information. For example, in a case where external keyboard information including the external keyboard ID 262 and the external keyboard name 264 of the wireless keyboard 20 is stored, the external keyboard communication processor 104 can establish a connection with the wireless keyboard 20 based on this external keyboard information. Thus, the multifunction peripheral 10 can identify an external keyboard registered therewith using an external keyboard ID and an external keyboard name based on external keyboard information, connect to the identified external keyboard, and initiate communication with the identified external keyboard. The multifunction peripheral 10 does not communicate with any other keyboards (unregistered keyboards) than registered external keyboards, and therefore can disregard key input from such unregistered external keyboards. If a connection with an external keyboard has already been established, the controller 100 (external keyboard communication processor 104) refrains from performing the process in Step S102 (No in Step S100).

Subsequently, the controller 100 displays an operation screen on the display 140 (Step S104). For example, the controller 100 displays, on the display 140, a screen for inputting information to be used for user authentication or a screen to be used for job setting and execution.

Subsequently, the controller 100 determines whether or not the multifunction peripheral 10 is ready to receive key input from the external keyboard on the operation screen (Step S106). The multifunction peripheral 10 being ready to receive key input means that, for example, a cursor is displayed in a field for inputting characters such as a text box (referred to below as "character input field"), waiting for character input. The controller 100 may determine that the multifunction peripheral 10 is ready to receive key input based on the user selecting the character input field, or may determine that the multifunction peripheral 10 is ready to receive key input based on the cursor being displayed in the character input field upon the operation screen being displayed. If the multifunction peripheral 10 is not ready to receive key input, the controller 100 repeats the process in Step S106 (No in Step S106).

Subsequently, the controller 100 determines whether or not key input information has been received from the external keyboard connected in Step S102 (Step S108). That is, the controller 100 determines whether or not key input has been performed on the external keyboard. For example, the controller 100 determines whether or not key input information has been received from the external keyboard connected in Step S102 through a process performed by the external keyboard communication processor 104. It should be noted that the controller 100 disregards any key input information received from external keyboards (unregistered external keyboards) other than the external keyboard connected in Step S102.

If key input information has been received from the external keyboard, the controller 100 displays a character inputted by the user (Yes in Step S108→Step S110). For example, upon determining in Step S108 that a key code has been received as key input information, the controller 100 displays a character corresponding to the received key code in the character input field where the cursor is being displayed.

If key input information has not been received from the external keyboard, the controller 100 determines whether or not the soft keyboard switch waiting time (for example, five seconds), which is the time prestored in the setting table 166, has elapsed since the multifunction peripheral 10 became ready to receive key input (No in Step S108→Step S112). If the soft keyboard switch waiting time has not elapsed since the multifunction peripheral 10 became ready to receive key input, the controller 100 returns to Step S108 (No in Step S112→Step S108).

If there has been no key input on the wireless keyboard 20 and no key input information has been received from the wireless keyboard 20 within the soft keyboard switch waiting time since the multifunction peripheral 10 became ready to receive key input, the controller 100 displays a soft keyboard on the display 140 (Yes in Step S112→Step S114). In this case, upon the user performing key input via the soft keyboard, for example, the controller 100 displays a character corresponding to a key inputted via the soft keyboard.

Subsequently, the controller 100 determines whether or not key input information has been received from the external keyboard (Step S116). The process in Step S116 is the same as that in Step S108.

If key input information has been received from the external keyboard, the controller 100 hides the soft keyboard displayed in Step S114 (Yes in Step S116→Step S118) and displays a character inputted (Step S110). In such a case, if key input has already been performed via the soft keyboard displayed in Step S114, the controller 100 may or may not reset what has already been inputted. In a case where the controller 100 does not reset what has already been inputted, the user can additionally input a character using the external keyboard, following a character inputted via the soft keyboard. In a case where the controller 100 resets what has already been inputted, the user can newly input a character using the external keyboard.

If key input information has not been received from the external keyboard, the controller 100 executes a predetermined process based on a user's operation (No in Step S116). For example, the controller 100 displays a character in the character input field where the cursor is being displayed, in response to key input performed on the soft keyboard.

The controller 100 may perform the processes in Step S118 and Step S110 also in a case where the user has performed key input on the external keyboard after performing key input on the soft keyboard displayed in Step S114.

If another character input field becomes ready to receive key input or if a character input field on another operation screen becomes ready to receive key input after the soft keyboard has been displayed in Step S114, the controller 100 may execute the processing by starting with Step S114. That is, in a situation where the need for different key input arises after the user has started using the multifunction peripheral 10 and the soft keyboard has been displayed for an operation screen, such as a login screen, that requires key input first, the controller 100 displays the soft keyboard without adhering to the soft keyboard switch waiting time. This allows the user to continue to perform key input via the soft keyboard.

1.4. Operation Example

The following describes an operation example of the present embodiment with reference to FIGS. 8A to 10. The diagrams shown as FIGS. 8A to 10 are examples of screens to be displayed on the display 140 of the multifunction peripheral 10.

Figure 8A:
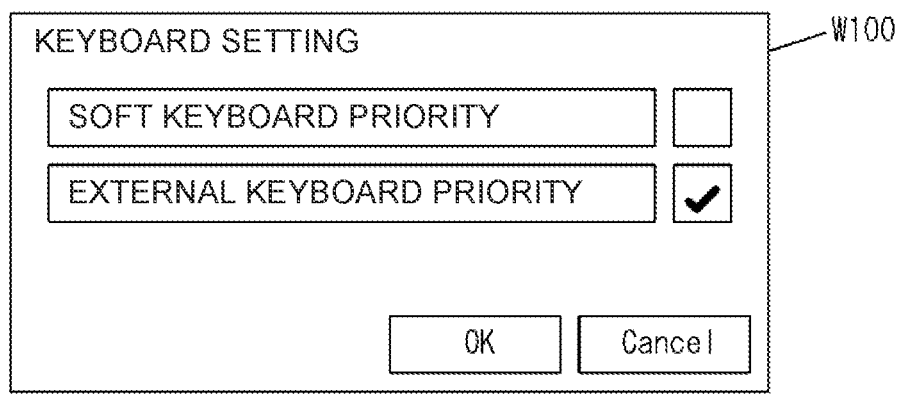
FIGS. 8A to 8C are each a diagram for describing operation in a case where an external keyboard is set to be preferentially used.

FIG. 8A shows a screen W100 for selecting a keyboard to be used for key input (keyboard setting) in an information processing apparatus such as the multifunction peripheral 10. The user can select either "soft keyboard priority" or "external keyboard priority" as the keyboard setting.

The selected setting is stored in the setting table 166.

Figure 8B:
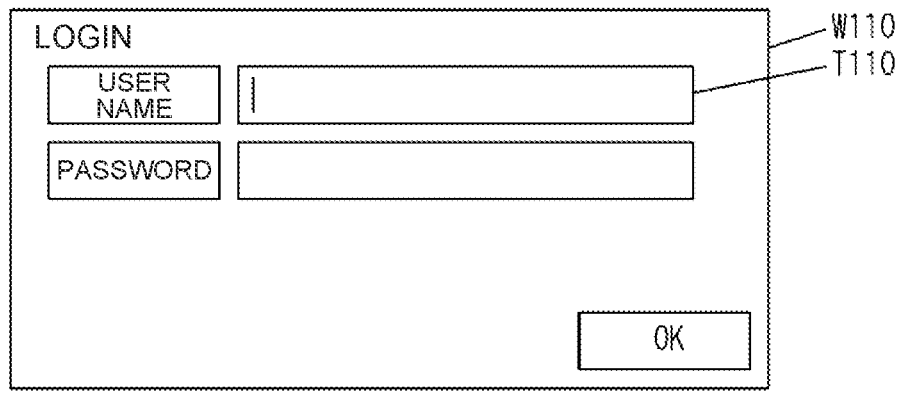
Figure 8C:
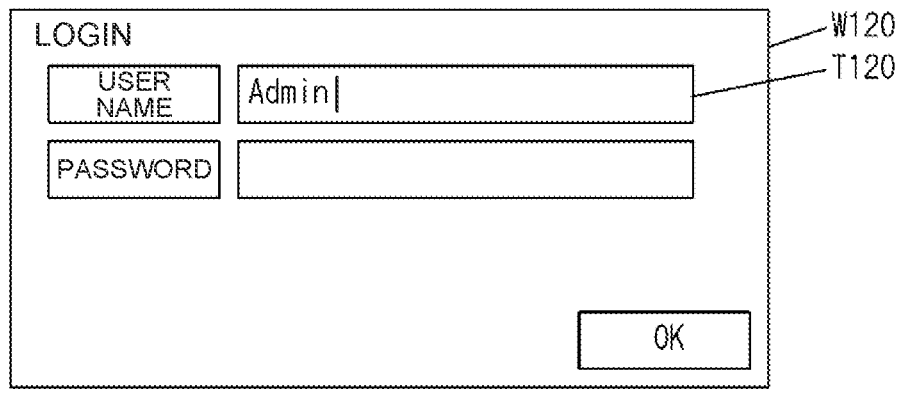

FIGS. 8B and 8C show screens to be displayed on the multifunction peripheral 10 in a case where "external keyboard priority" is selected on the screen W100. FIG. 8B shows a screen W110 for login, where a character input field T110 is ready to receive key input. In this example, the multifunction peripheral 10 does not need to display a soft keyboard on the screen. The external keyboard transmits a key code to the multifunction peripheral 10 when a key switch is pressed. The multifunction peripheral 10 displays a screen W120 on which characters corresponding to key codes received are displayed in a character input field T120 that is ready to receive key input. This allows the user to input characters by pressing key switches on the external keyboard, without the soft keyboard being displayed on the screen.

Figure 9A:
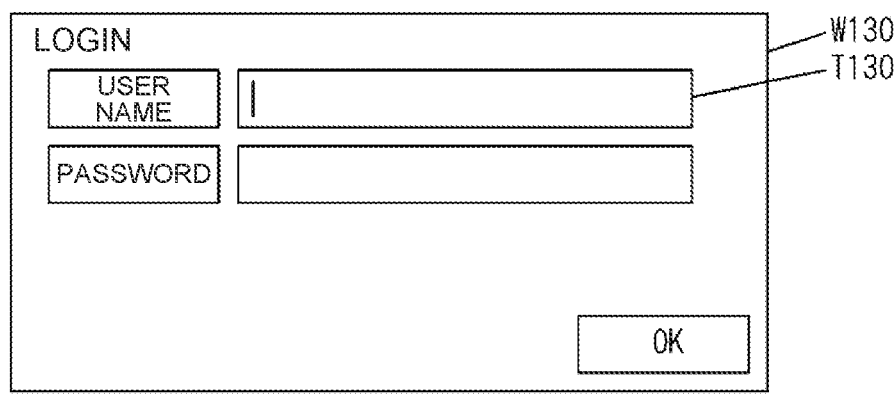
FIGS. 9A and 9B are each a diagram for describing operation in a case where a soft keyboard is set to be preferentially used.
Figure 9B:
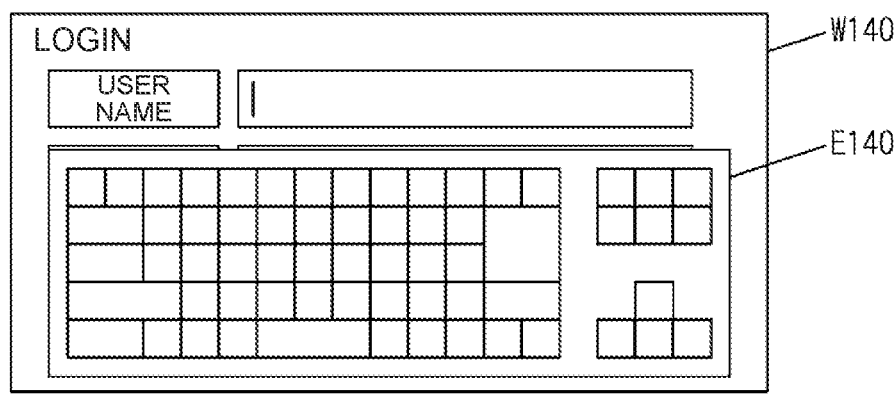

FIGS. 9A and 9B are diagrams showing screens to be displayed on the multifunction peripheral 10 in a case where "soft keyboard priority" is selected on the screen W100. FIG. 9A shows a screen W130 for login. The user can set a character input field T130 ready to receive key input by selecting the character input field T130. At the same time, a screen W140 shown in FIG. 9B is displayed, and a soft keyboard E140 is displayed on this screen. The user can perform key input via the soft keyboard E140. In this example, the multifunction peripheral 10 needs to display the soft keyboard on the screen. In this case, it is necessary to display the soft keyboard on the displayed screen to assist in key input, or to prepare another screen having a soft keyboard and switch the screen being displayed to the screen prepared.

Figure 10:
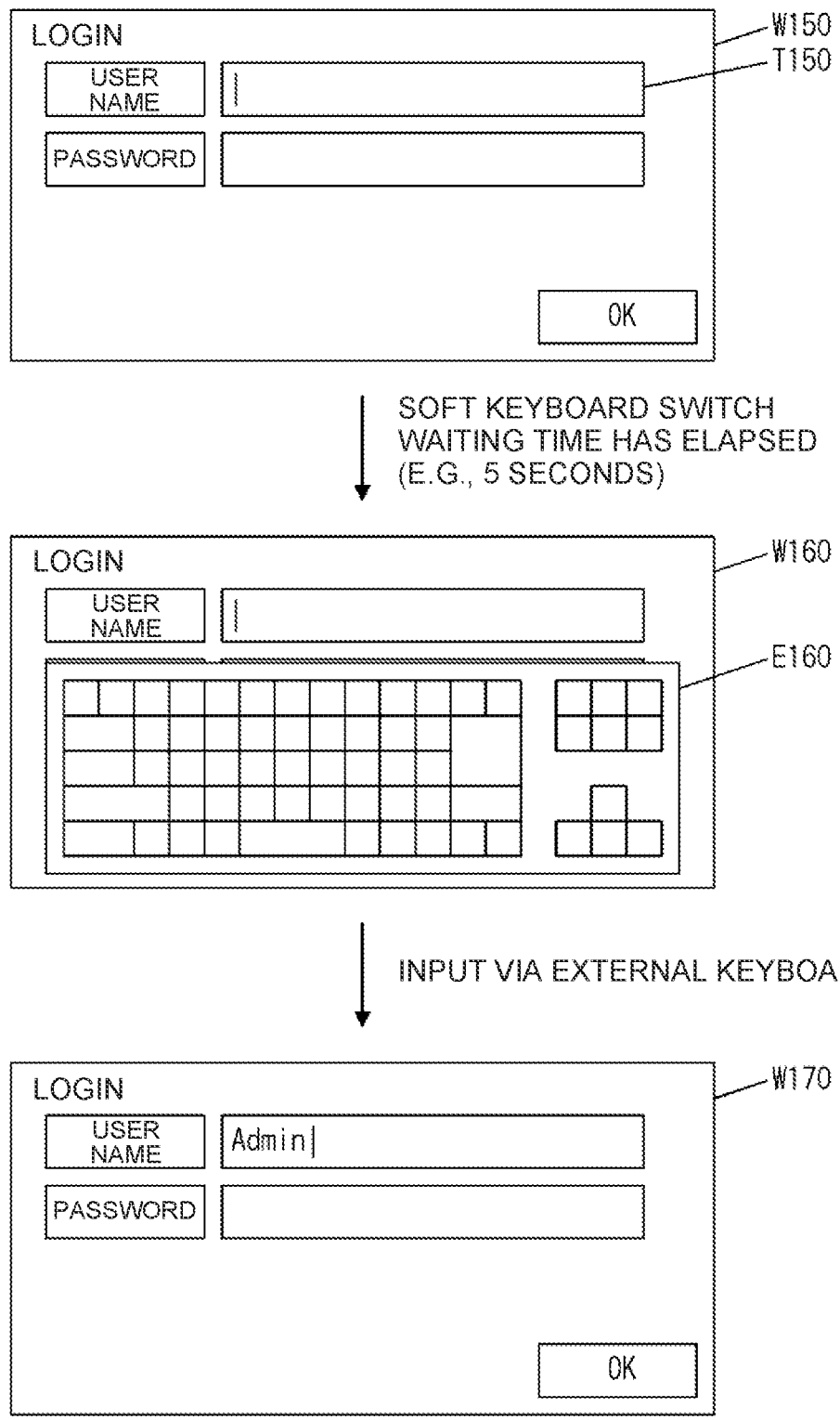
FIG. 10 is a diagram showing an example of operation according to the first embodiment.

FIG. 10 is a diagram showing characteristic operation of the multifunction peripheral 10 according to the present embodiment. A screen W150 shown in FIG. 10 is the same as the screen W110 shown in FIG. 8B. That is, "external keyboard priority" is selected as the keyboard setting, and a character input field T150 is ready to receive key input. If the soft keyboard switch waiting time (for example, five seconds) elapses without key input information being received from the external keyboard, a screen W160 in FIG. 10 is displayed. A soft keyboard E160 is displayed on the screen W160. That is, the predetermined time has elapsed since the multifunction peripheral 10 became ready to receive key input, and thus the screen W150 for inputting characters using the external keyboard is switched to the screen W160 (soft keyboard input screen) for performing key input using the soft keyboard. This allows the user to perform key input via the soft keyboard.

If key input is performed on the external keyboard after the screen W150 has been switched to the soft keyboard input screen, the multifunction peripheral 10 removes the soft keyboard from the screen and displays a screen without the soft keyboard, giving priority to external keyboard input. As a result, a screen W170 in FIG. 10 is displayed. This allows the user to perform key input via the external keyboard.

In the description given above, the information processing apparatus 2 is described as the multifunction peripheral 10. However, the information processing apparatus 2 may alternatively be the terminal device 11a or the information display device 11b. To achieve this configuration, the terminal device 11a or the information display device 11b includes the controller 100, the display 140, the storage 160, and the short-range wireless communication executor 180, and the controller 100 functions as the external keyboard communication processor 104 and executes the processing shown in FIG. 7. Furthermore, the key code information storage area 162 and the external keyboard information storage area 164 are reserved in the storage 160 of the terminal device 11a or the information display device 11b, so that the storage 160 stores therein key code information and external keyboard information as well as the setting table 166.

In the description given above, the input device 3 is described as the wireless keyboard 20. However, the input device 3 may alternatively be the terminal device 21. In this case, the terminal device 21 may have the configuration shown in FIG. 6 and may include, if necessary, a display 240 that displays various information. The terminal device 21 may have a touch panel including the display 240 and the operation acceptor 250 integrated into one unit. The touch sensor may detect, for example, an input through a contact (touch) by a common detection method such as a resistive method, an infrared method, an inductive method, or a capacitive method.

For example, the terminal device 21 may be a smartphone that employs Bluetooth. The smartphone may be configured to communicate with the multifunction peripheral 10 and transmit information indicating the content of key input and characters inputted by the user to the multifunction peripheral 10 using an application for character input or keyboard key input, such as a key input application. In this case, the smartphone allows for flick input and toggle input as well as general keyboard input.

Upon flick input or toggle input being performed thereon, the smartphone transmits information on an inputted character to the multifunction peripheral 10 as key input information. The multifunction peripheral 10 receives the information on the character inputted and transmitted using the key input application, and displays the character. In this case, the multifunction peripheral 10 switches the operation screen displayed on the display 140 to the soft keyboard input screen if no flick input or toggle input is performed for a predetermined period of time.

The terminal device 21 may also receive input of a character string from the user and transmit information on the inputted character string to the multifunction peripheral 10. In this case, upon receiving such character string information, the multifunction peripheral 10 displays the inputted character string. The multifunction peripheral 10 switches the operation screen displayed on the display 140 to the soft keyboard input screen if no character string information is received for a predetermined period of time.

As described above, the multifunction peripheral according to the present embodiment displays a soft keyboard despite having a wireless keyboard connected thereto as an external keyboard, if key input from the wireless keyboard is not received on a screen that requires key input for a predetermined period of time. This allows the user to perform key input using the soft keyboard even when the user cannot perform key input using the external keyboard such as a wireless keyboard.

The problem here is that the physical location of the wireless keyboard can become uncertain, because the wireless keyboard and the multifunction peripheral are not cable-connected. In a situation where the storage location of the wireless keyboard is uncertain or the wireless keyboard is in a hard-to-find location, the user might struggle to quickly locate the wireless keyboard. If the keyboard setting is to preferentially use an external keyboard for key input in such a situation, the user needs to find the wireless keyboard or change the setting to display a soft keyboard. To address this problem, the multifunction peripheral according to the present embodiment displays the soft keyboard input screen after a lapse of a predetermined period of time, allowing the user to easily perform key input using the soft keyboard. In this way, the multifunction peripheral according to the present embodiment can assist the user by automatically switching external keyboard input to soft keyboard input when there has been no input from the wireless keyboard for a predetermined period of time, such as when the user is having trouble finding the wireless keyboard.

If key input is performed on the external keyboard such as a wireless keyboard after the soft keyboard has been displayed, the multifunction peripheral according to the present embodiment removes the soft keyboard and displays a character according to the key input performed on the external keyboard. Owing to this configuration, the multifunction peripheral according to the present embodiment eliminates the need for the user to switch the keyboard set to be used for key input from the soft keyboard to the external keyboard. Thus, if the user finds the wireless keyboard after the soft keyboard has been displayed, for example, the user can switch the keyboard for key input from the soft keyboard to the wireless keyboard by simply performing key input using the wireless keyboard.

As described above, the information processing apparatus according to the present embodiment, such as a multifunction peripheral, allows for an increase in convenience in a situation where a device to be used for key input is wirelessly connected, and allows for an improvement in usability of a soft keyboard and an external keyboard such as a wireless keyboard.

2. Second Embodiment

A second embodiment involves, in addition to the processing in the first embodiment, displaying messages when a soft keyboard is displayed and when the soft keyboard is hidden. The present embodiment corresponds to the first embodiment in which FIG. 7 is replaced with FIG. 11. The same functional units and processes as in the first embodiment are labeled with the same reference signs as in the first embodiment, and description thereof is omitted.

2.1. Flow of Processing

Figure 11:
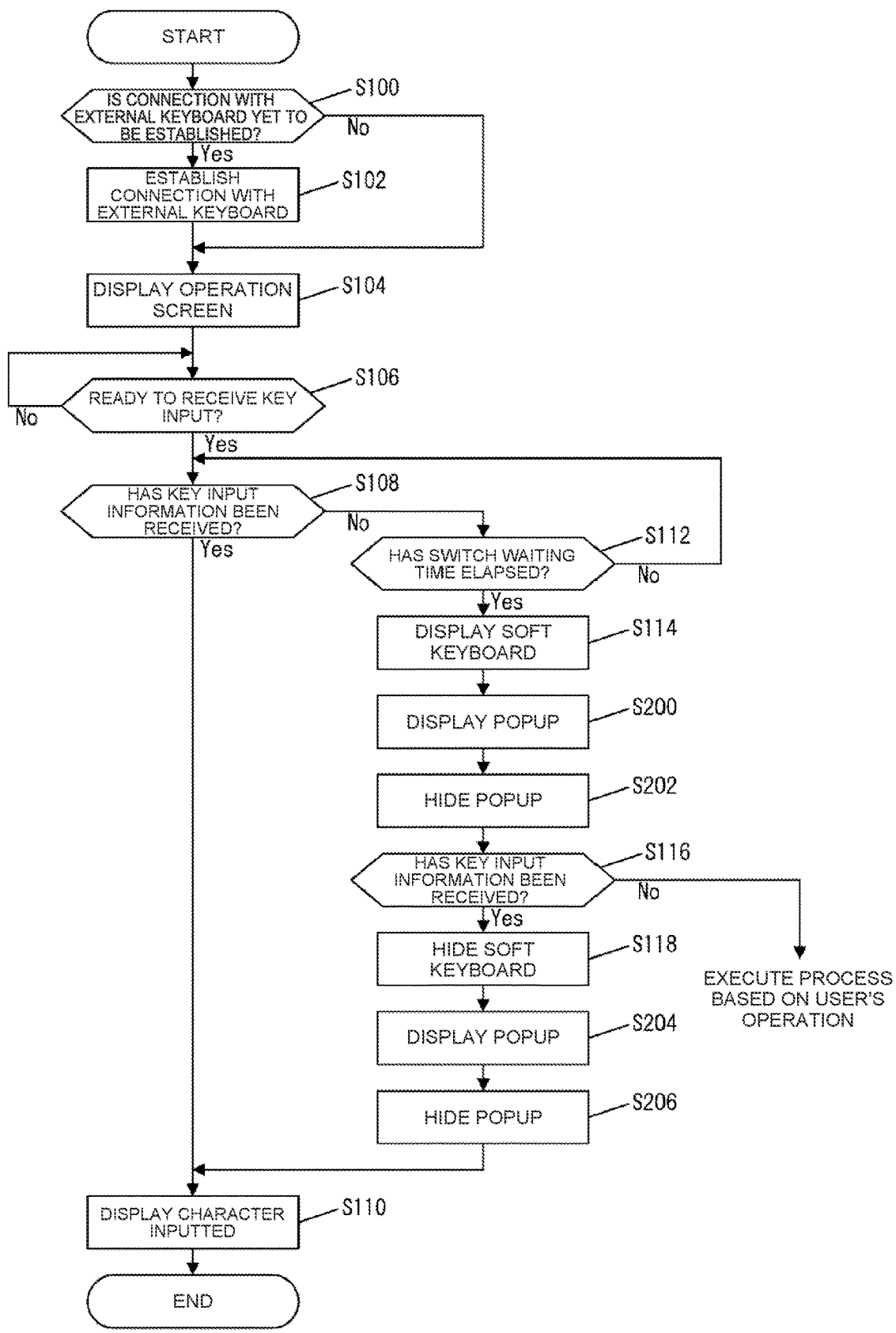
FIG. 11 is a flowchart showing a flow of main processing according to a second embodiment.

FIG. 11 is a diagram showing a flow of main processing to be executed by the multifunction peripheral 10 in the present embodiment. After displaying the soft keyboard in Step S114, the controller 100 according to the present embodiment displays, on the display 140, a popup containing a message indicating that the screen has been switched to the soft keyboard input screen (Step S200). The controller 100 hides the popup displayed in Step S200 either upon a user's acknowledgement operation or after a lapse of a predetermined period of time (Step S202).

Similarly, after hiding the soft keyboard in Step S118, the controller 100 displays, on the display 140, a popup containing a message indicating that the screen has been switched from the soft keyboard input screen to a screen for receiving key input from the external keyboard (Step S204). The controller 100 hides the popup displayed in Step S204 either upon a user's acknowledgement operation or after a lapse of a predetermined period of time (Step S206).

2.2. Operation Example

Figure 12:
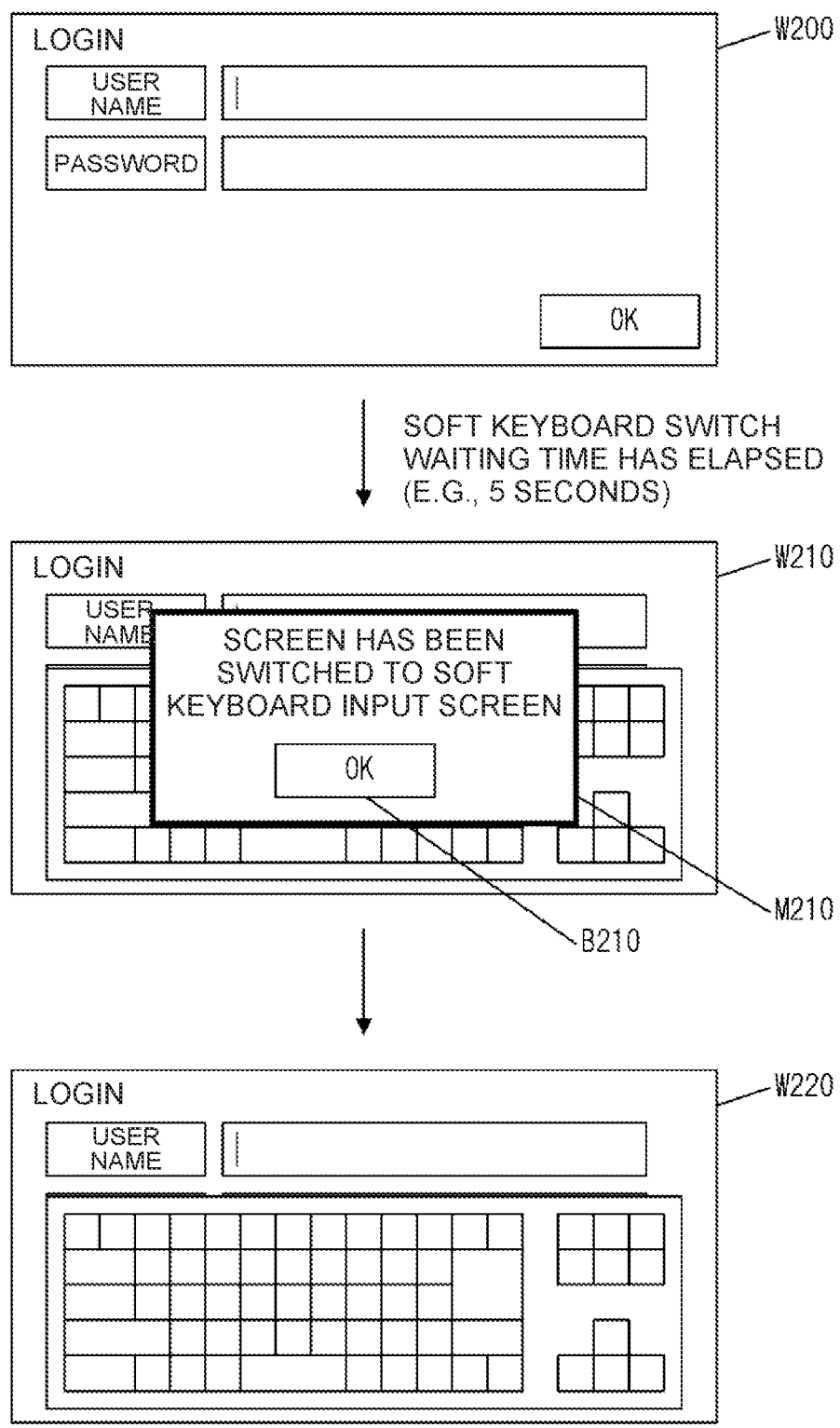
FIG. 12 is a diagram showing an example of operation according to the second embodiment.

FIG. 12 is a diagram showing screens to be displayed on the display 140 when the operation screen is switched to the soft keyboard input screen. A screen W200 shown in FIG. 12 is the same as the screen W150 shown in FIG. 10. According to the present embodiment, if the soft keyboard switch waiting time elapses without key input information being received from the external keyboard, a popup M210 is displayed as shown on a screen W210 in FIG. 12. The popup M210 may be hidden when a button B210 for acknowledgement is pressed by the user, or may be hidden after an elapse of a certain period of time (time-based removal). After the popup M210 has been hidden, a screen W220 shown in FIG. 12 is displayed. The screen W220 is the same as the screen W160 shown in FIG. 10.

As described above, displaying popups is added when the operation screen is switched to the soft keyboard input screen in the present embodiment.

Figure 13:
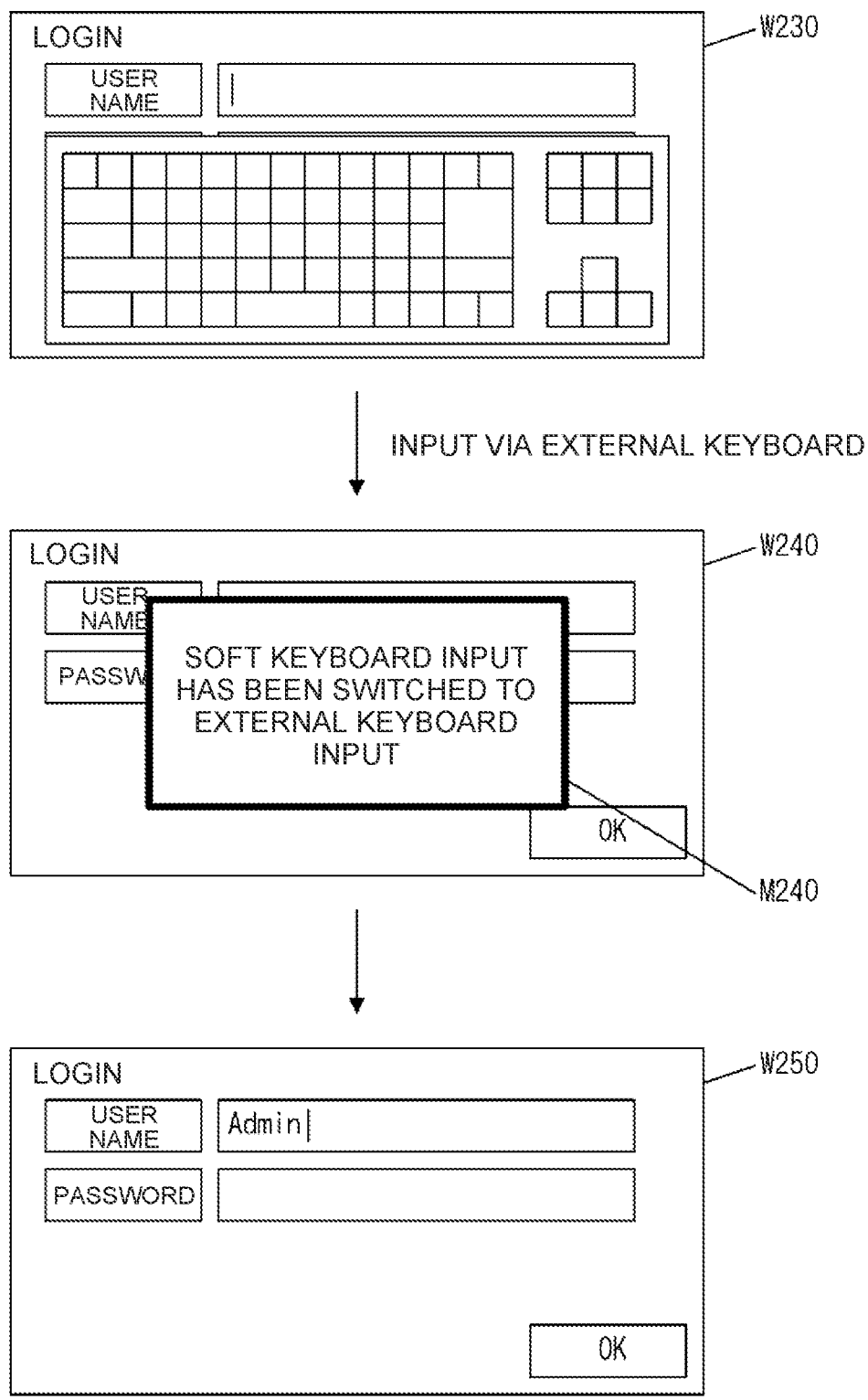
FIG. 13 is a diagram showing an example of operation according to the second embodiment.

FIG. 13 is a diagram showing screens to be displayed on the display 140 when the soft keyboard input screen is switched to the original operation screen. A screen W230 shown in FIG. 13 is the same as the screen W220 shown in FIG. 12. Upon the user performing key input on the external keyboard, a popup M240 is displayed indicating that key input has been switched to input via the external keyboard as shown on a screen W240 in FIG. 13. The popup M240 may be hidden after a lapse of a certain period of time (time-based removal) to allow for continued input using the external keyboard. Alternatively, the popup M240 may be hidden when key switches are pressed a predetermined number of times on the external keyboard. That is, the popup M240 may be automatically hidden. Unlike the popup M210 shown in FIG. 12, therefore, the popup M240 does not need to include a button for acknowledgement. However, like the popup M210, the popup M240 may include a button for the user's acknowledgement to be hidden when this button is pressed. Thereafter, a screen W250 shown in FIG. 13 is displayed as an operation screen on which the popup M240 has been hidden.

As described above, the multifunction peripheral according to the present embodiment can notify the user that the screen has been switched (that the keyboard set to be used for key input has been switched) by displaying messages when the soft keyboard is displayed and when the soft keyboard is hidden.

3. Third Embodiment

A third embodiment involves, in addition to the processing in the first embodiment, displaying a soft keyboard in a case where valid key input is not obtained from an external keyboard connected to the multifunction peripheral. The present embodiment corresponds to the first embodiment in which FIG. 7 is replaced with FIG. 14. The same functional units and processes as in the first embodiment are labeled with the same reference signs as in the first embodiment, and description thereof is omitted.

According to the present embodiment, the case where valid key input is not obtained from an external keyboard connected to the multifunction peripheral refers to the following two cases.

(1) Case where key input information is received from an unregistered external keyboard
(2) Case where inappropriate information that would not normally be received is received as key input information from an external keyboard connected to the multifunction peripheral Inappropriate information that would not normally be received is, for example, (a) an unknown key code or (b) information indicating that an operation of inputting and then deleting the same key has been repeated.

Unknown key codes refer to key codes that are not stored as key code information (invalid key codes). For example, in a situation where the external keyboard is one that supports input of a special key and requires installation of a driver, the multifunction peripheral 10 can receive an unknown key code when the special key is inputted.

The multifunction peripheral 10 receives information indicating that an operation of inputting and then deleting the same key has been repeated when, for example, an operation of transmitting and then deleting the same key code is performed on the external keyboard a predetermined number of times or more in a row.

Specifically, the same key can be inputted in the following cases.

Case where the external keyboard is behaving abnormally (malfunctioning)

Case where multiple external keyboards are connected to the multifunction peripheral 10 and something is physically touching a key switch on one of the external keyboards that is not being used by the user According to the present embodiment, conditions for displaying a soft keyboard even if key input information is received from an external keyboard are referred to as determination conditions. According to the present embodiment, a condition for determining that inappropriate information is received as key input information is one of the determination conditions. That is, according to the present embodiment, the multifunction peripheral 10 displays a soft keyboard even if the multifunction peripheral 10 receives key input information from an external keyboard connected thereto, as long as any of the determination conditions is met.

Figure 14:
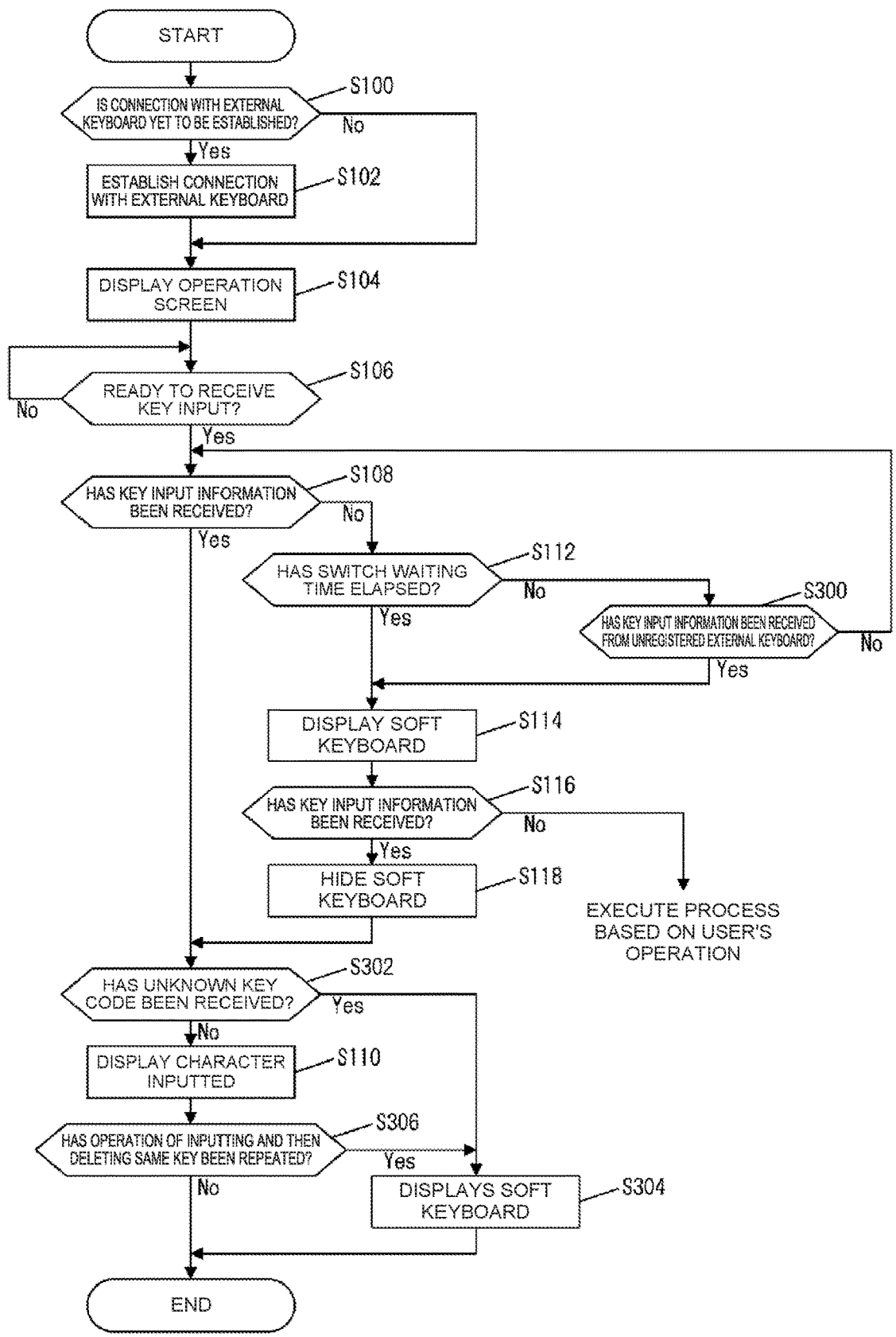
FIG. 14 is a flowchart showing a flow of main processing according to a third embodiment.

FIG. 14 is a diagram showing a flow of main processing to be executed by the multifunction peripheral 10 according to the present embodiment.

Upon determining in Step S112 that the soft keyboard switch waiting time has not elapsed, the controller 100 according to the present embodiment determines whether or not key input information has been received from an unregistered external keyboard (No in Step S112→Step S300).

For example, besides the information transmitted from the external keyboard connected in Step S102, the controller 100 receives key input information (for example, a key code) transmitted from another external keyboard via the short-range wireless communication executor 180. Then, upon receiving such key input information via the short-range wireless communication executor 180, the controller 100 determines whether or not the external keyboard information storage area 164 contains external keyboard information corresponding to the external keyboard that has transmitted this information. If the external keyboard information storage area 164 does not contain external keyboard information corresponding to the external keyboard that has transmitted the key input information, the controller 100 determines that key input has been performed on an unregistered external keyboard.

If key input information has been received from an unregistered external keyboard, the controller 100 displays the soft keyboard (Yes in Step S300→Step S114). If key input information has not been received from an unregistered external keyboard, the controller 100 returns to Step S108 (No in Step S300→Step S108).

Upon determining that key input information has been received from the external keyboard connected in Step S102, the controller 100 determines whether or not any of the determination conditions is met. The determination conditions are that an unknown key code has been received, and that the operation of inputting and then deleting the same key has been repeated. Cases where key input is received via an external keyboard include a case where the determination result in Step S108 is Yes, and a case where the determination result in Step S116 is Yes and the soft keyboard is hidden.

First, the controller 100 determines whether or not an unknown key code has been received as key input information (Yes in step S108→Step S302). If an unknown key code has been received, the controller 100 displays a soft keyboard, determining that one of the determination conditions is met (Yes in Step S302→Step S304). The controller 100 may display a soft keyboard if an unknown key code is received more than once (for example, three times), determining that one of the determination conditions is met. The number of unknown key codes to be received before displaying a soft keyboard may be stored in the setting table 166.

If a known key code has been received, the controller 100 displays a character corresponding to the received key code (No in Step S302→Step S110).

The controller 100 also determines whether not the operation of inputting and then deleting the same key has been repeated multiple times (for example, five times) (Step S306). If the operation of inputting and then deleting the same key has been repeated multiple times, the controller 100 displays a soft keyboard, determining that one of the determination conditions is met (Yes in Step S306→Step S304). The number of times this operation is to be repeated before displaying a soft keyboard may be stored in the setting table 166. The controller 100 may keep disregarding key input information received from the external keyboard on which the operation of inputting and then deleting the same key has been repeated, until the user finishes using the multifunction peripheral 10 (for example, until the user logs out of the multifunction peripheral 10 or until job execution is completed). If an operation of inputting the same key is not followed by multiple repetitions of a deletion operation, the controller 100 refrains from performing the process in Step S304 (No in Step S306).

The controller 100 can display a soft keyboard when key input is performed on an unregistered keyboard, such as when a keyboard that is not registered with the multifunction peripheral 10 is accidentally operated by the user, by executing the processing described above. This prevents the user from continuing to operate the unregistered keyboard and allows the user to perform operations using a soft keyboard.

The controller 100 can also display a soft keyboard when key input is received via an external keyboard that does not allow normal processing, such as a keyboard including a special key, or when key input behavior is different from normal. This prevents unintended key input from being received via an external keyboard connected to the multifunction peripheral 10 and allows the user to perform key input using the soft keyboard.

When displaying the soft keyboard in the processing shown in FIG. 14, the controller 100 may notify the user of the reason for displaying the soft keyboard. For example, the controller 100 may display a message indicating that the soft keyboard is being displayed because the operation of inputting and then deleting the same key has been repeated.

In the description given above, the following three cases are mentioned as the case where valid key input is not obtained: the case where input has been performed on an unregistered external keyboard, the case where an unknown key has been inputted, and the case where the operation of inputting and then deleting the same key has been repeated. However, the case where valid key input is not obtained may be limited to one or two of these three cases. Limiting the case where valid key input is not obtained to one or two of these three cases enables the controller 100 to execute the processing shown in FIG. 14 in a simplified manner.

For example, instead of displaying a soft keyboard when key input is performed on an unregistered keyboard as described in the present embodiment, the multifunction peripheral 10 may disregard key input performed on an unregistered keyboard as described in the first embodiment. For another example, the multifunction peripheral 10 may be settable either to disregard key input or to display a soft keyboard when key input is performed on an unregistered keyboard.

The determination conditions may be other than the cases mentioned above. For example, the multifunction peripheral 10 may use a determination condition that a character that is not among characters expected to be inputted has been inputted. For example, the multifunction peripheral 10 may determine that a determination condition is met if key input information corresponding to a character that is not among characters usable for e-mail addresses has been received in a character input field for entering an e-mail address. For another example, the multifunction peripheral 10 may use a determination condition that a control key has been inputted multiple times, a determination condition that a control key that would not normally be inputted (key that is not included in key switches) has been inputted, or a determination condition that key input has been performed at a rate exceeding a predetermined keystroke speed (for example, 20 times per second).

As described above, the multifunction peripheral according to the present embodiment allows for an increase in user convenience by displaying a soft keyboard, and thus enabling key input from the soft keyboard, in a case where valid key input is not obtained through the use of an external keyboard.

4. Fourth Embodiment

Figure 15:
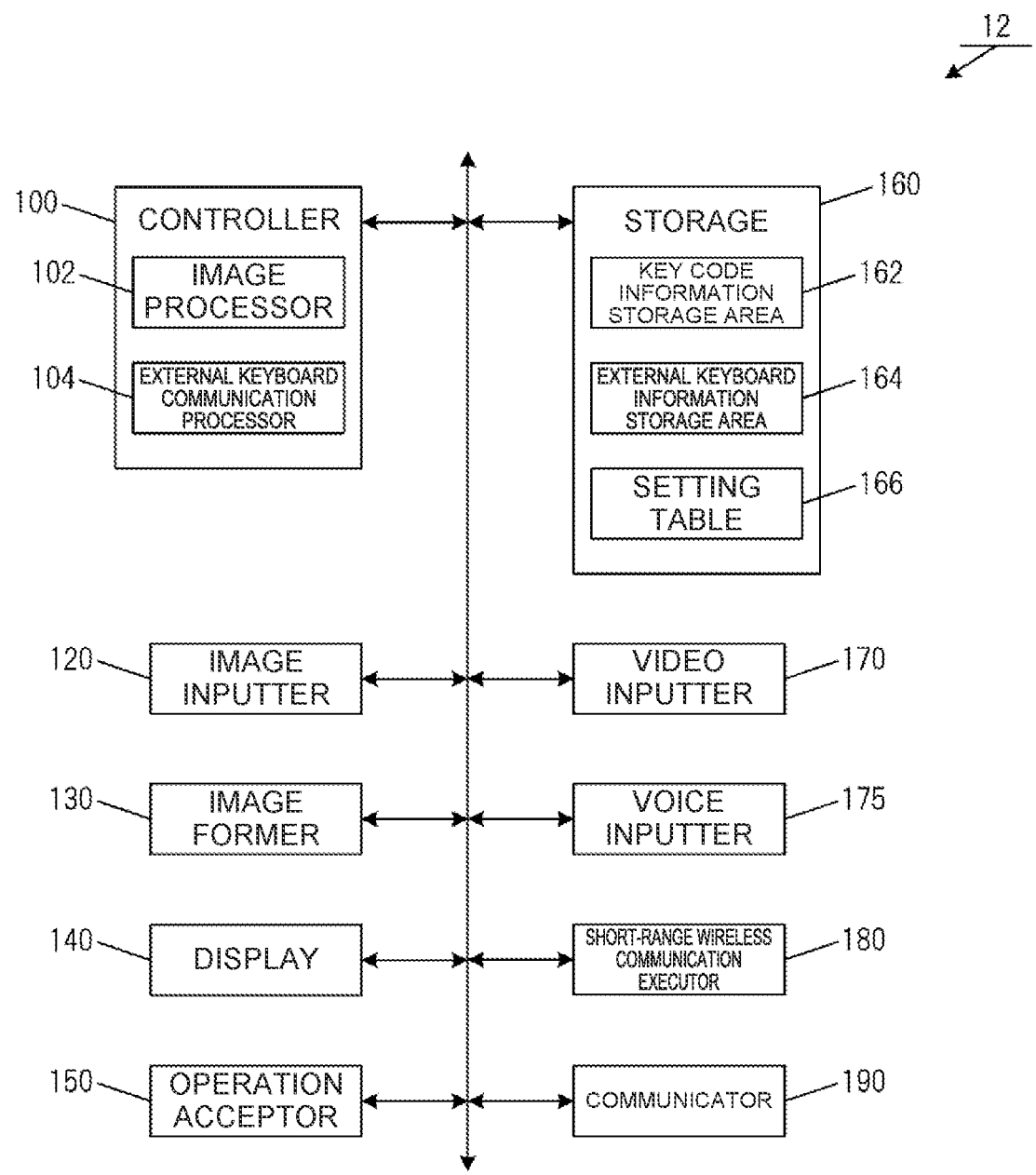
FIG. 15 is a diagram illustrating a functional configuration of a multifunction peripheral according to a fourth embodiment.

A fourth embodiment involves, in addition to the processing in the first embodiment, displaying a soft keyboard even if key input information is received from an external keyboard, as long as it is determined, based on the user's behavior, that inappropriate information has been received as key input information. The present embodiment corresponds to the first embodiment in which FIG. 2 is replaced with FIG. 15 and FIG. 7 is replaced with FIG. 16. The same functional units and processes as in the first embodiment are labeled with the same reference signs as in the first embodiment, and description thereof is omitted.

The present embodiment uses, as a determination condition such as described in the third embodiment, at least one of a case where a key indicated by a finger of the user is different from a key indicated by key input information and a case where voice suggesting abnormal input is uttered by the user.

4.1. Functional Configuration

FIG. 15 is a diagram illustrating a functional configuration of a multifunction peripheral 12 according to the present embodiment. The multifunction peripheral 12 differs from the multifunction peripheral 10 shown in FIG. 2 in that the former further includes a video inputter 170 and a voice inputter 175.

The video inputter 170 is a functional unit that receives a video signal transmitted from external equipment such as a video input device (for example, a camera) and outputs the video signal to the controller 100. The video inputter 170 may be a camera provided in the multifunction peripheral 12 or an external camera connected to an input interface for video input.

The voice inputter 175 is a functional unit that outputs voice information based on voice inputted from a voice input device (for example, a microphone) to the controller 100. The voice inputter 175 may be a microphone provided in the multifunction peripheral 12 or an external microphone connected to an input interface for voice input.

4.2. Flow of Processing

Figure 16:
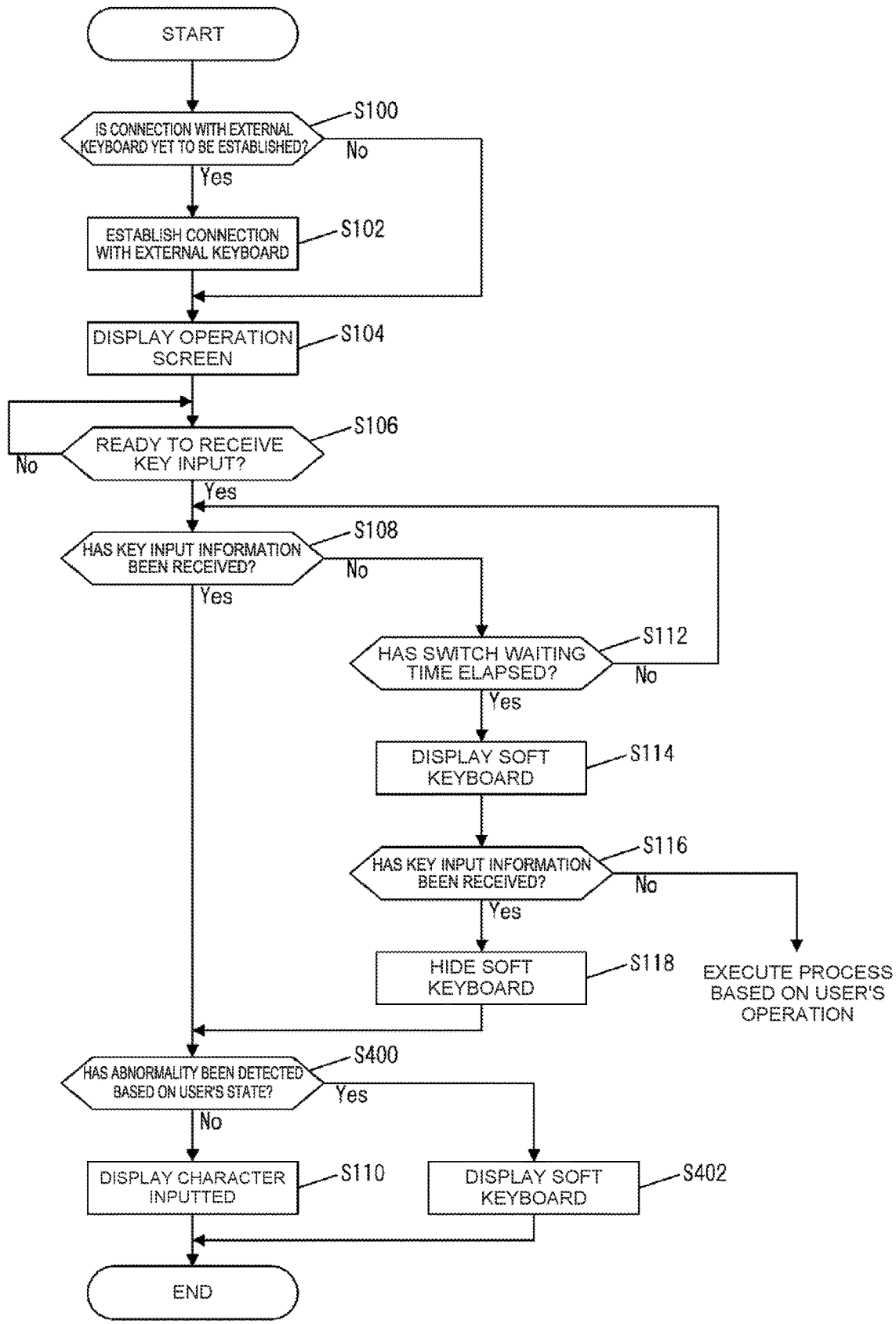
FIG. 16 is a flowchart showing a flow of main processing according to the fourth embodiment.

The following describes a flow of main processing to be executed by the multifunction peripheral 12 according to the present embodiment with reference to FIG. 16. If key input information has been received from the external keyboard, the controller 100 according to the present embodiment determines whether or not an input-related abnormality has been detected based on the user's state (Step S400). The input-related abnormality means that input that is different from the user's intended input is received.

For example, the controller 100 acquires a key (inputted key) that a finger of the user is pointing to, based on video inputted through the video inputter 170. The controller 100 then determines whether or not the inputted key matches a key indicated by the key input information received from the external keyboard (for example, a key corresponding to the key code). If the inputted key does not match the key indicated by the content of key input, the controller 100 detects an occurrence of an input-related abnormality. In this case, information on a key that is not the key inputted by the user has been received from the external keyboard, possibly due to input from another external keyboard being mixed in.

The controller 100 also recognizes voice information inputted through the voice inputter 175. If the user utters a voice suggesting abnormal input (for example, "Huh? Something is wrong."), the controller 100 detects an occurrence of an input-related abnormality. In this case, a character that is not intended by the user has been inputted, possibly due to the external keyboard having a malfunction.

The controller 100 does not detect an occurrence of an input-related abnormality when the inputted key matches the key code received from the external keyboard or when the user does not utter voice suggesting abnormal input.

If an input-related abnormality has been detected, the controller 100 displays a soft keyboard (Yes in Step S400→Step S402). If an input-related abnormality has not been detected, the controller 100 displays a character inputted by the user (No in Step S400→Step S110).

It should be noted that the multifunction peripheral 12 may only include either one of the video inputter 170 and the voice inputter 175, and may detect an input-related abnormality based on either one of inputted video and inputted voice.

As described above, the multifunction peripheral according to the present embodiment can assist in valid key input by displaying a soft keyboard upon detecting unintended key input.

5. Fifth Embodiment

A fifth embodiment involves, in addition to the processing in the first embodiment, determining whether or not an abnormality detected in an external keyboard has been resolved when key input information is received from the same external keyboard and performing processing according to the determination result. The present embodiment corresponds to the first embodiment in which FIG. 4 is replaced with FIG. 17 and FIG. 7 is replaced with FIGS. 18 and 19. The same functional units and processes as in the first embodiment are labeled with the same reference signs as in the first embodiment, and description thereof is omitted.

5.1. Functional Configuration

FIG. 17 is a diagram showing an example of a data structure of keyboard information according to the present embodiment. In addition to the external keyboard information shown in FIG. 4, external keyboard information according to the present embodiment contains the presence or absence of an abnormality (for example, "Present"), which indicates whether or not the external keyboard has experienced an abnormality. The presence or absence of an abnormality may be stored in any form of information that helps identify whether or not there has been an abnormality. The present embodiment will be described using a configuration in which either "Present", which indicates that an external keyboard has experienced an abnormality, or "Absent", which indicates that an external keyboard is not experiencing any abnormality, is stored.

An external keyboard experiencing an abnormality means the external keyboard failing to operate normally. For example, an external keyboard is determined to be experiencing an abnormality if any of the determination conditions described in the third and fourth embodiments is met. An external keyboard may be determined to be experiencing an abnormality if a connection abnormality occurs while the external keyboard is in connection with the multifunction peripheral 10 or if data in an inappropriate format is received from the external keyboard.

5.2. Flow of Processing

Figure 18:
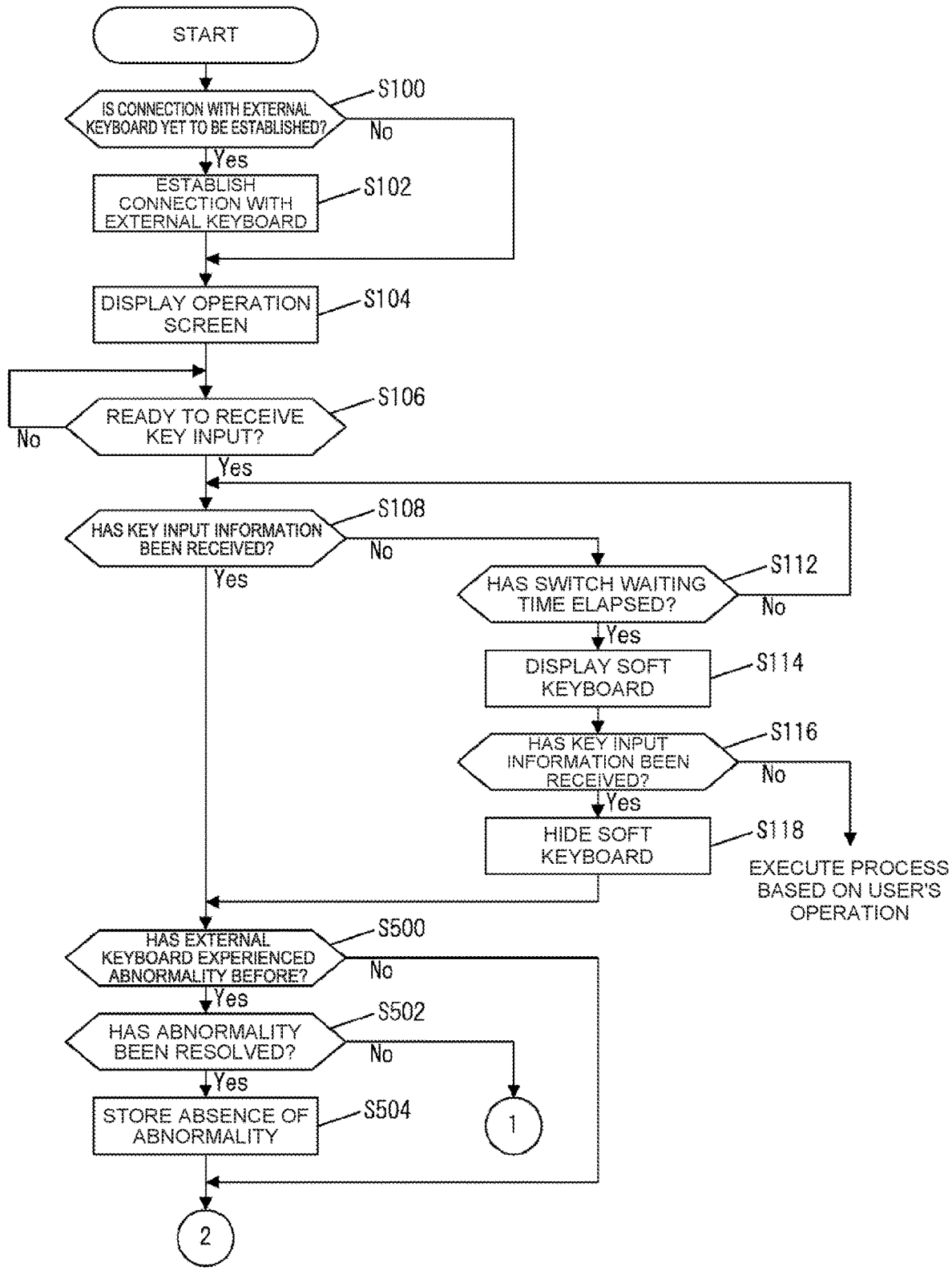
FIG. 18 is a flowchart showing a flow of main processing according to the fifth embodiment.
Figure 19:
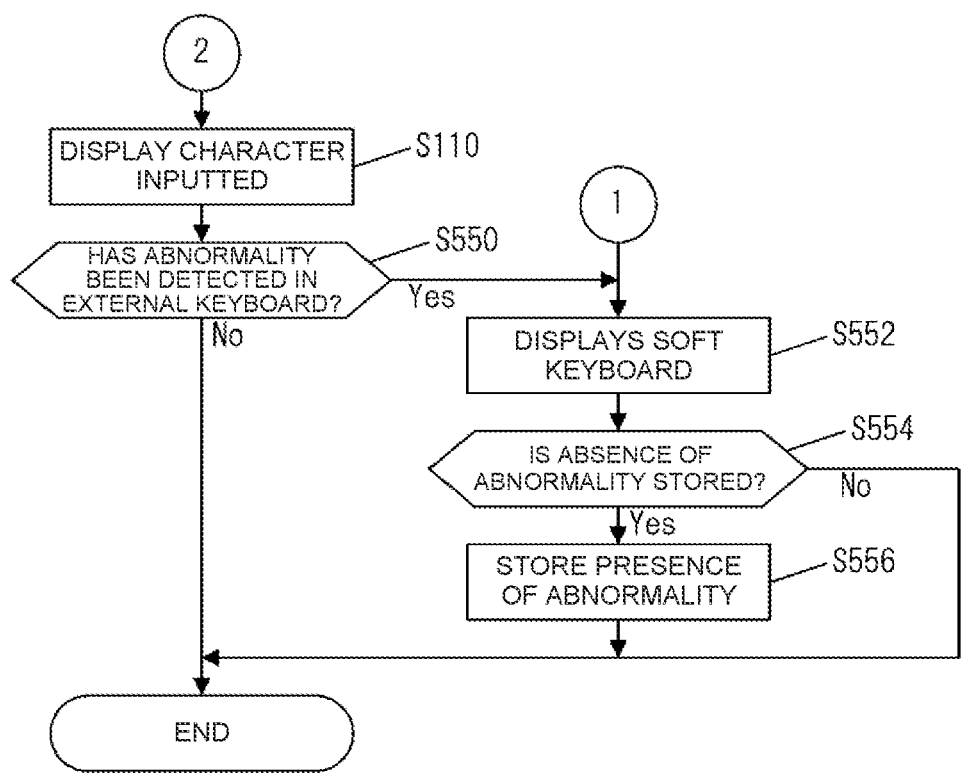
FIG. 19 is a flowchart showing a flow of main processing according to the fifth embodiment.

FIGS. 18 and 19 are each a diagram showing a flow of main processing to be executed by the multifunction peripheral 10 according to the present embodiment. When key input is performed on an external keyboard, the controller 100 according to the present embodiment determines whether or not this external keyboard has experienced an abnormality before the user starts using the multifunction peripheral 10 (Step S500). For example, the controller 100 reads, from the external keyboard information storage area 164, keyboard information corresponding to the external keyboard used for the key input, and determines that the external keyboard has experienced an abnormality before the user starts using the multifunction peripheral 10 if the presence or absence of abnormality contained in the external keyboard information is "Present".

Upon determining that the external keyboard has experienced an abnormality, the controller 100 determines whether or not the abnormality has been resolved (Step S502). The controller 100 determines that the abnormality has been resolved if, for example, the determination condition is no longer met, or if the connection to the external keyboard and information transmitted from the external keyboard are appropriate. In Step S502, for example, the controller 100 displays a screen for receiving key input from the external keyboard and requests key input from the user. The controller 100 determines whether or not the determination condition is met, and whether or not there is an abnormality in the connection to the external keyboard and in the information received from the external keyboard, based on the key input information received from the external keyboard. The controller 100 determines that the abnormality has been resolved if the determination condition is no longer met, or if there is no abnormality in the connection to the external keyboard or in the information received from the external keyboard. Alternatively, the controller 100 may determine that the abnormality has been resolved if the user confirms that the external keyboard is not experiencing any abnormality. In this case, the controller 100 displays, on the display 140, a message "Do you wish to continue using the external keyboard you are currently operating?" and buttons respectively reading "Yes" and "No". If "Yes" is selected by the user, the controller 100 determines that the user has confirmed that the external keyboard being operated by the user is not experiencing any abnormality.

If the abnormality has been resolved, the controller 100 stores information indicating that the external keyboard used for the key input is not experiencing any abnormality (Yes in Step S502→Step S504). For example, the controller 100 updates the presence or absence of abnormality in the external keyboard information read in Step S500 to "Absent".

Referring now to FIG. 19, after displaying a character inputted by the user, the controller 100 determines whether or not an abnormality has been detected in the external keyboard used for the key input (Step S550). If an abnormality has been detected in the external keyboard, the controller 100 displays a soft keyboard (Yes in Step S550→Step S552). Furthermore, if the keyboard information corresponding to the external keyboard used for the key input contains information indicating that the external keyboard is not experiencing any abnormality, the controller 100 stores information indicating that the external keyboard has experienced an abnormality (Yes in Step S554→Step S556). For example, the controller 100 updates the presence or absence of abnormality in the external keyboard information read in Step S500 to "Present". If the external keyboard information contains information indicating that the external keyboard used for the key input has experienced an abnormality, the controller 100 refrains from performing the process in Step S556 (No in Step S554). Upon determining in Step S550 that no abnormality has been detected in the external keyboard, the controller 100 refrains from performing the processes in Steps S552 to S556 (No in Step S550).

Upon determining in Step S502 in FIG. 18 that the abnormality has not been resolved, the controller 100 performs the processes in Steps S552 to S556 described above (Step S502). For example, upon determining in Step S502 that the external keyboard still meets the determination condition, the controller 100 display the soft keyboard.

The present embodiment has been described using a configuration in which information indicating that an external keyboard has experienced an abnormality, if any, is stored, and when input is received from the same external keyboard, the controller determines whether or not the external keyboard is experiencing an abnormality at the beginning. Alternatively, when an external keyboard experiences an abnormality, the controller may delete registered external keyboard information corresponding to the external keyboard, instead of performing the process described above. In this case, the external keyboard that has experienced an abnormality needs to start over with registration (pairing). The multifunction peripheral 10 may refuse to register an external keyboard if an abnormality is detected in the external keyboard at the time of the registration. This configuration also enables the multifunction peripheral to determine, when the external keyboard that has experienced an abnormality is used next time, whether or not the external keyboard is experiencing an abnormality at the beginning.

As described above, even for an external keyboard that has already been registered through pairing or the like, the multifunction peripheral according to the present embodiment stores information indicating that the external keyboard has experienced an abnormality, once an abnormal operation (key input) or the like is detected in the external keyboard. When the multifunction peripheral according to the present embodiment is used next time, and key input is received via the external keyboard that has experienced an abnormality, the multifunction peripheral determines whether or not the abnormality has been resolved, and displays a soft keyboard if the abnormality has not been resolved. This configuration enables the multifunction peripheral according to the present embodiment to avoid continued use of an external keyboard experiencing an abnormality and to lead the user to perform valid key input.

6. Sixth Embodiment

A sixth embodiment involves, in addition to the processing in the first embodiment, disregarding input from external keyboards other than those registered by the user using the multifunction peripheral.

Figure 20:
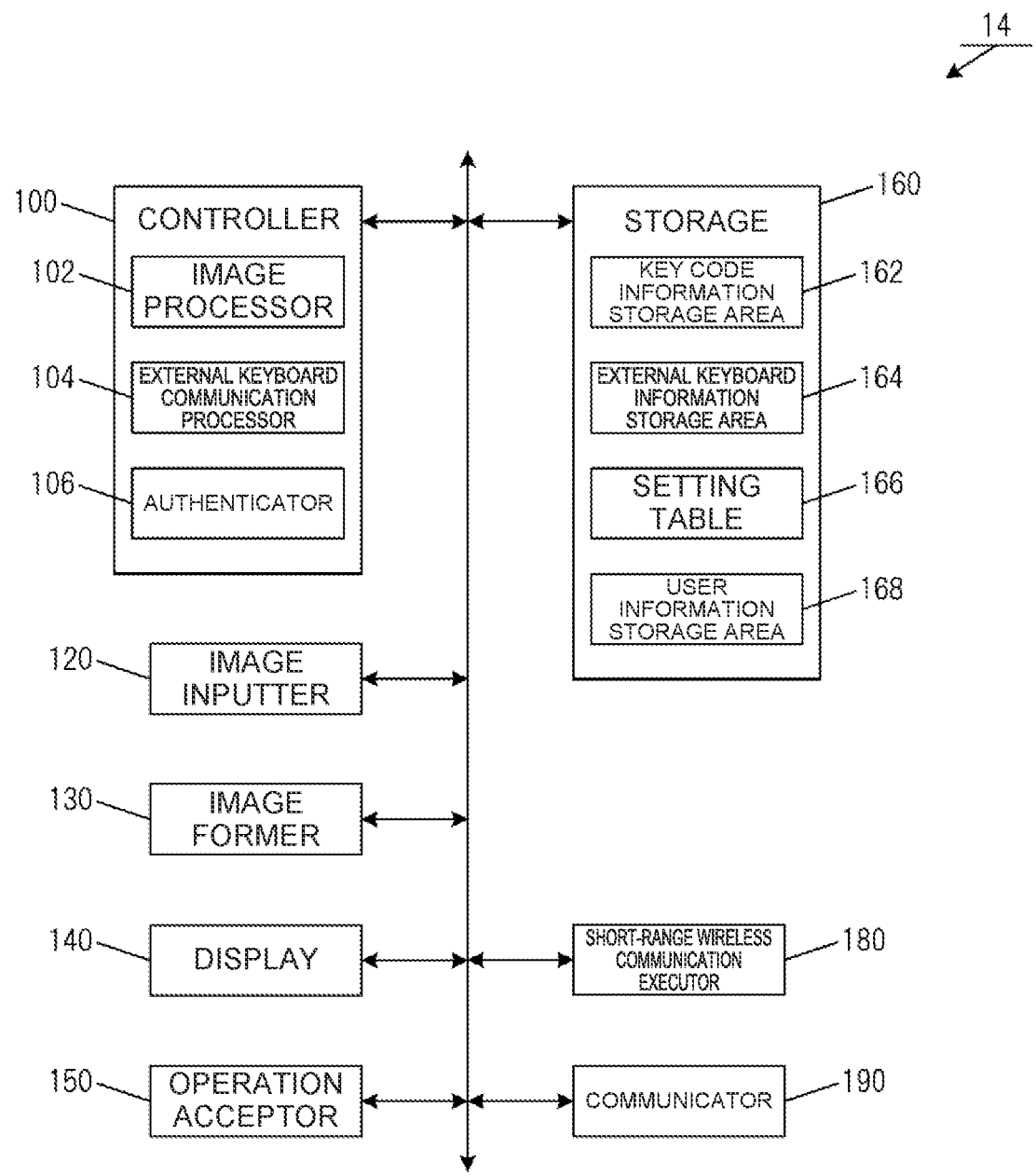
FIG. 20 is a diagram illustrating a functional configuration of a multifunction peripheral according to a sixth embodiment.
Figure 22:
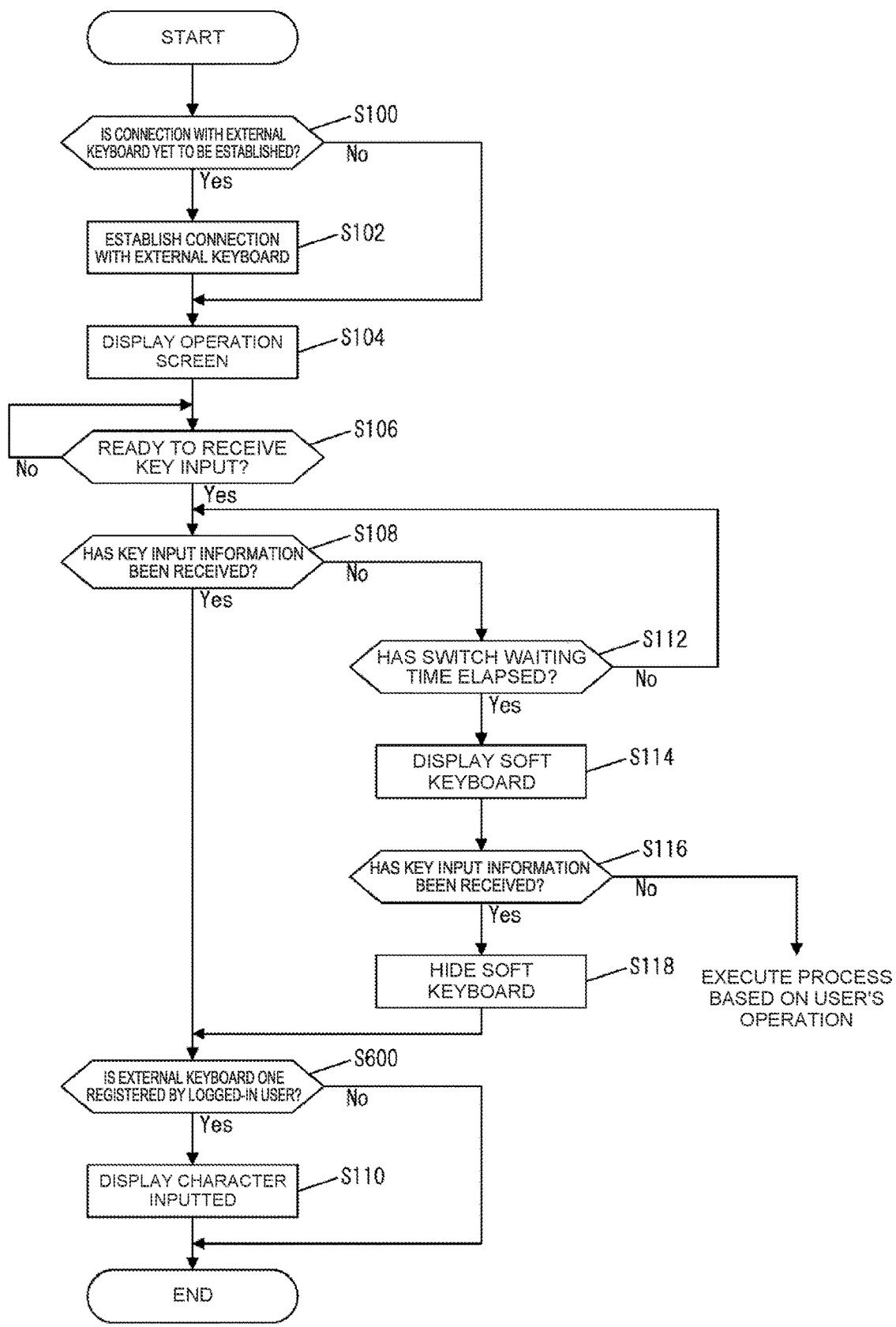
FIG. 22 is a flowchart showing a flow of main processing according to the sixth embodiment.

The present embodiment corresponds to the first embodiment in which FIG. 2 is replaced with FIG. 20 and FIG. 7 is replaced with FIG. 22. The same functional units and processes as in the first embodiment are labeled with the same reference signs as in the first embodiment, and description thereof is omitted.

6.1. Functional Configuration

FIG. 20 is a diagram illustrating a functional configuration of a multifunction peripheral 14 according to the present embodiment. The multifunction peripheral 14 differs from the multifunction peripheral 10 shown in FIG. 2 in that the controller 100 further functions as an authenticator 106 and a user information storage area 168 is further reserved in the storage 160 in the multifunction peripheral 14.

The authenticator 106 executes a process of authenticating a user who uses the multifunction peripheral 14 (login process). The authenticator 106 may employ a common authentication method for user authentication, such as knowledge-based authentication using a user name and a password, biometric authentication (fingerprint recognition, voice recognition, facial recognition), or possession-based authentication using, for example, an ID card or a mobile terminal device. The authenticator 106 may connect to an authentication server, transmit authentication information to the authentication server, and perform the user authentication based on the authentication result from the authentication server. Information required for the authentication (authentication information) is inputted by the user. The multifunction peripheral 14 may also include a device necessary for the authentication (for example, an IC card reader, a near field communication (NFC) reader, a magnetic reader, a fingerprint sensor, a voice input device, or a camera).

Information on each user who uses the multifunction peripheral 14 (user information) is stored in the user information storage area 168. As shown in FIG. 21, the user information includes a user name (for example, "Admin"), which is a name given to the user, an ID of a card owned by the user (for example, "abc123"), and an external keyboard ID identifying an external keyboard registered by the user (for example, "00:11:22:33:44:44:55").

The card ID is information that is compared with the authentication information inputted by the user. The information that is compared with the authentication information may be information that is compared in knowledge-based authentication (a user name and a password) or information that is compared in biometric authentication.

As the external keyboard ID, for example, the device address of each external keyboard is stored.

It should be noted that information other than the external keyboard ID may be stored as long as the information allows for identification of the corresponding external keyboard. Examples of information that allows for identification of the corresponding external keyboard include a product serial number of the external keyboard, an ID set for the external keyboard, or a name given to the external keyboard.

A plurality of external keyboards may be registered for one user. In this case, the external keyboard ID includes a plurality of keyboard IDs.

6.2. Flow of Processing

FIG. 22 is a diagram showing a flow of main processing to be executed by the multifunction peripheral 14 according to the present embodiment. The multifunction peripheral 14 performs user authentication before performing the processing shown in FIG. 22. For example, the authenticator 108 authenticates, as a user granted access to the multifunction peripheral 14, a user corresponding to user information including authentication information (for example, a card ID) inputted by the user. In the following description, the user authenticated as a user granted access to the multifunction peripheral 14 is referred to as a logged-in user.

In the present embodiment, when key input is performed on an external keyboard, the controller 100 determines whether or not the external keyboard is an external keyboard registered by the logged-in user (Step S600).

For example, in Step S108 or Step S116, the controller 100 receives key input information and the external keyboard ID of the external keyboard from which the key input information has been transmitted. If the received external keyboard ID matches any of the external keyboard IDs contained in user information related to the logged-in user, the controller 100 determines that the external keyboard used for the key input is an external keyboard registered by the logged-in user.

If the external keyboard used for the key input is a keyboard registered by the logged-in user, the controller 100 displays a character inputted by the user (Yes in Step S600→Step S110). If the external keyboard used for the key input is not an external keyboard registered by the logged-in user (if the external keyboard used for the key input is an unregistered external keyboard for the logged-in user), the controller 100 refrains from performing the process in Step S110 (No in Step S600). That is, the controller 100 disregards the key input information received.

When refraining from performing the process in Step S110, the controller 100 may display, on the display 140, a soft keyboard or a message indicating that key input has been performed via an unregistered external keyboard. The multifunction peripheral 14 may be settable either to disregard key input or to display a soft keyboard if the external keyboard used for the key input is not an external keyboard registered by the logged-in user.

As described above, the multifunction peripheral according to the present embodiment disregards key input when the key input is performed on an external keyboard other than the external keyboard registered by the logged-in user (external keyboard associated with the logged-in user). This configuration enables the multifunction peripheral to avoid reflecting unintended key input by disregarding key input performed using an external keyboard registered by a user other than the logged-in user, allowing the logged-in user to perform valid key input.

7. Seventh Embodiment

A seventh embodiment involves, in addition to the processing in the first embodiment, displaying a soft keyboard when the remaining battery level of an external keyboard is low. The present embodiment corresponds to the first embodiment in which FIG. 7 is replaced with FIG. 23. The same functional units and processes as in the first embodiment are labeled with the same reference signs as in the first embodiment, and description thereof is omitted.

Figure 23:
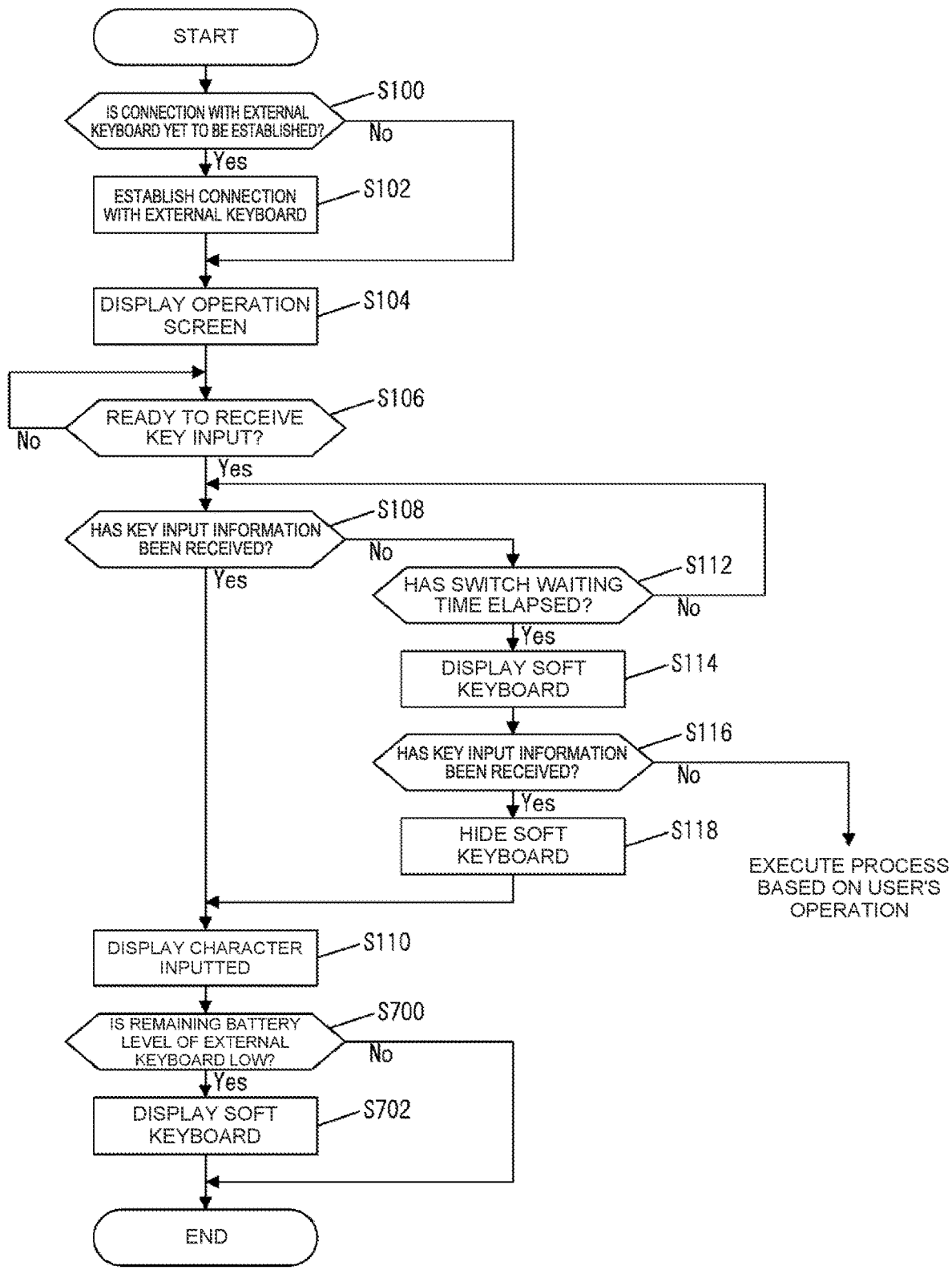
FIG. 23 is a flowchart showing a flow of main processing according to a seventh embodiment.

FIG. 23 is a diagram showing a flow of main processing to be executed by the multifunction peripheral 10 according to the present embodiment. After displaying an inputted character, the controller 100 according to the present embodiment determines whether or not the remaining battery level of the external keyboard operated by the user is low (whether or not the remaining battery level of the external keyboard is less than or equal to a threshold value) (Step S700). The controller 100 acquires the remaining battery level of the external keyboard at a predetermined timing from the external keyboard or receives the remaining battery level at the same time as the acquisition of the key input information. The threshold value of the remaining battery level (for example, "20%") may be stored in the setting table 166. In this case, the controller 100 determines that the remaining battery level of the external keyboard is low if the remaining battery level of the external keyboard is less than or equal to the threshold value of the remaining battery level stored in the setting table 166.

If the remaining battery level of the external keyboard is low, the controller 100 displays a soft keyboard (Yes in Step S700→Step S702). In this case, the controller 100 may display a confirmation message to prompt the user to confirm the keyboard switching before displaying the soft keyboard, and then display the soft keyboard after obtaining the user's consent. The controller 100 may also display a notification message notifying the user that the keyboard has been switched when displaying the soft keyboard. If the remaining battery level of the external keyboard is sufficient, the controller 100 refrains from performing the process in Step S702 (No in Step S700).

As described above, the multifunction peripheral according to the present embodiment displays a soft keyboard even if valid key input is received via the external keyboard, as long as the remaining battery level of the external keyboard is low. This configuration enables the multifunction peripheral according to the present embodiment to display a soft keyboard and allow the user to continue valid key input when continuing input is likely to become impossible due to battery depletion.

8. Modification Example

The present disclosure is not limited to any of the embodiments described above, and various modifications may be made.

That is, the technical scope of the present disclosure also includes an embodiment obtained by combining technical measures modified as appropriate without departing from the gist of the present disclosure.

Although some parts of the foregoing embodiments are described separately for convenience of explanation, it is needless to say that such embodiments may be combined and implemented within a technically allowable range. For example, the second embodiment and the third embodiment may be combined. In this case, the multifunction peripheral can display a message indicating that the keyboard has been switched when displaying a soft keyboard following a detection of an abnormality in the external keyboard, in addition to when key input is not received from the external keyboard for a predetermined period of time.

The program(s) that operates on each device (apparatus) in the foregoing embodiments is a program that controls the CPU or the like (program that causes a computer to function) so as to implement the functions according to the foregoing embodiments. Information handled by each device (apparatus) is temporarily accumulated in a temporary storage device (for example, RAM)) during processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, Digital Versatile Disc (DVD)), a Magneto Optical Disc (MO), a Mini Disc (MD), a Compact Disc (CD), and a Blu-ray (registered trademark) Disc (BD)), and a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

Furthermore, the functional blocks or various features of the device/apparatus used in the embodiments described above may be implemented or executed as an electrical circuit, such an integrated circuit or a plurality of integrated circuits. An electrical circuit designed to execute the functions described herein may include a general-purpose processor, a digital signal processor (DSP), an application-specific integrated circuit (ASIC), a field programmable gate array (FPGA), or other programmable logic devices, discrete gates or transistor logic, discrete hardware components, or a combination of these. A general-purpose processor may be a microprocessor or a conventional processor, controller, microcontroller, or state machine. The electrical circuit described above may be configured by a digital circuit or an analog circuit. Moreover, when an integrated circuit technology that replaces the current integrated circuits emerges as a result of advances in semiconductor technology, one or more aspects of the present disclosure may also use the new integrated circuits based on such technology.

What is claimed is:

1. An information processing apparatus comprising:
   a display;
   a communicator that communicates with a key input receiving device; and
   a controller that performs control to display a soft keyboard on the display in a case that the controller does not receive information indicating a key input from the key input receiving device, and remains connected to the key input receiving device, that is connected with the information processing apparatus, and before a predetermined period of time elapses after the information processing apparatus is capable of receiving the key input.

2. The information processing apparatus according to claim 1, further comprising a storage that stores therein information on the key input receiving device, wherein
   the controller further performs the control to display the soft keyboard on the display in a case that the controller receives information indicating a key input from a device other than the key input receiving device the information of which is stored in the storage.

3. The information processing apparatus according to claim 1, wherein the controller further displays the soft keyboard on the display even in a case that the controller receives the information indicating the key input from the key input receiving device, as long as a determination condition is met.

4. The information processing apparatus according to claim 3, wherein the determination condition is that the controller receives an unknown key code.

5. The information processing apparatus according to claim 3, wherein the determination condition is that an operation of inputting and then deleting the same key is repeated.

6. The information processing apparatus according to claim 3, wherein the determination condition is at least one of the following: that a key indicated by a finger of a user is different from a key indicated by the information indicating the key input; and that voice suggesting abnormal input is uttered by the user.

7. The information processing apparatus according to claim 1, wherein, in a case that the key input receiving device that has transmitted the information indicating the key input has experienced an abnormality before a user starts using the information processing apparatus, the controller further determines whether or not the abnormality has been resolved, and displays the soft keyboard on the display in a case that the abnormality has not been resolved.

8. The information processing apparatus according to claim 1, further comprising a storage that stores therein information on the key input receiving device, wherein
   in a case that the controller receives information indicating a key input from a device other than the key input receiving device the information of which is stored in the storage, the controller further disregards the received information.

9. The information processing apparatus according to claim 8, wherein
   the storage further stores therein information on key input receiving devices on a user-by-user basis, and
   in a case that the controller receives information indicating a key input from a device that is not a key input receiving device associated with a user using the information processing apparatus, the controller further disregards the received information.

10. The information processing apparatus according to claim 1, wherein the controller further receives information indicating a key input from a device that transmits the information indicating the key input by executing an application for key inputting.

11. The information processing apparatus according to claim 1, wherein the key input receiving device is connected with the information processing apparatus by radio waves.

12. A method for controlling an information processing apparatus including a display and a communicator that communicates with a key input receiving device, the method comprising performing control to display a soft keyboard on the display in a case that the information processing apparatus does not receive information indicating a key input from the key input receiving device, and remains connected to the key input receiving device, that is connected with the information processing apparatus, and before a predetermined period of time elapses after the information processing apparatus is capable of receiving the key input.

13. The method of controlling the information processing apparatus according to claim 12, wherein the key input receiving device is connected with the information processing apparatus by radio waves.

* * * * *